(12) United States Patent
Li et al.

(10) Patent No.: US 10,079,997 B2
(45) Date of Patent: Sep. 18, 2018

(54) MULTI-VIDEO STREAM TRANSMISSION METHOD AND DEVICE

(71) Applicant: Huawei Technologies Co., Ltd., Shenzhen (CN)

(72) Inventors: Dejian Li, Beijing (CN); Pei Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/607,238

(22) Filed: May 26, 2017

(65) Prior Publication Data

US 2017/0264866 A1   Sep. 14, 2017

Related U.S. Application Data

(63) Continuation of application No. PCT/CN2014/092577, filed on Nov. 28, 2014.

(51) Int. Cl.
| | |
|---|---|
| *H04N 7/15* | (2006.01) |
| *H04N 21/262* | (2011.01) |
| *H04N 21/234* | (2011.01) |
| *H04N 21/6373* | (2011.01) |

(Continued)

(52) U.S. Cl.
CPC ............. *H04N 7/152* (2013.01); *H04N 7/155* (2013.01); *H04N 21/234* (2013.01); *H04N 21/26275* (2013.01); *H04N 21/6373* (2013.01); *H04N 21/64792* (2013.01); *H04N 7/181* (2013.01)

(58) Field of Classification Search
USPC ........................................................ 348/14.1
See application file for complete search history.

(56) References Cited

U.S. PATENT DOCUMENTS

| | | | | |
|---|---|---|---|---|
| 7,506,043 | B2 * | 3/2009 | Ali ........................ | H04W 28/16 370/230 |
| 2007/0153916 | A1 | 7/2007 | Demirein et al. | |

(Continued)

FOREIGN PATENT DOCUMENTS

| | | |
|---|---|---|
| CN | 102209237 A | 10/2011 |
| CN | 103312967 A | 9/2013 |

(Continued)

OTHER PUBLICATIONS

Machine Translation and Abstract of Chinese Publication No. CN102209237, Oct. 5, 2011, 37 pages.

(Continued)

*Primary Examiner* — Amal Zenati
(74) *Attorney, Agent, or Firm* — Conley Rose, P.C.

(57) ABSTRACT

A multi-video stream transmission method and a device, where an access point sets an initial sending time and a sending period of an intra frame (I frame) of each station (STA) associated with the access point, and allocates an I frame service period and a predictive frame (P frame) service period to each STA according to the initial sending time and the sending period of the I frame of each STA, where each STA exclusively occupies a channel in the I frame service period and the P frame service period such that I frame sending time of STAs are staggered, network load balance is achieved, and it is ensured that a latency of each STA meets a quality of service (QoS) requirement.

12 Claims, 9 Drawing Sheets

| Element ID | Length | Reference user priority of STA 1 | ... | Reference user priority of STA N |
|---|---|---|---|---|

(51) Int. Cl.
  *H04N 21/647* (2011.01)
  *H04N 7/18* (2006.01)

(56) References Cited

U.S. PATENT DOCUMENTS

| | | | |
|---|---|---|---|
| 2008/0320170 A1* | 12/2008 | Yamauchi | H04N 7/183 709/247 |
| 2009/0086818 A1 | 4/2009 | Kim | |
| 2013/0242108 A1* | 9/2013 | Matsumoto | H04N 7/181 348/159 |
| 2013/0294743 A1 | 11/2013 | Thornberry | |
| 2016/0173813 A1 | 6/2016 | Matsumoto et al. | |

FOREIGN PATENT DOCUMENTS

| | | | |
|---|---|---|---|
| CN | 103780907 A | 5/2014 | |
| EP | 1049333 A2 | 11/2000 | |
| WO | 2004047444 A1 | 6/2004 | |

OTHER PUBLICATIONS

Machine Translation and Abstract of Chinese Publication No. CN103780907, May 7, 2014, 15 pages.

"Part 11: Wireless LAN Medium Access Control (MAC) and Physical Layer (PHY) Specifications," IEEE Computer Society, IEEE Std 802.11, Mar. 29, 2012, 2793 pages.

Cuenca, P., et al., "QoS and Statistical Multiplexing Performance of VBR MPEG-2 Video Sources over ATM Networks," XP10284879, 1998, pp. 33-36.

Feng, J., et al., "Simulation Analysis on Statistical Multiplexing of MPEG Video Sources," XP10227074, 1997, 5 pages.

"Series H: Audiovisual and Multimedia Systems, Infrastructure of audiovisual services—Coding of moving video, Advanced video coding for generic audiovisual services," ITU-T, H.264, Feb. 2014, 790 pages.

Foreign Communication Form a Counterpart Application, European Application No. 14907163.1, Extended European Search Report dated Jul. 25, 2017, 12 pages.

Foreign Communication From a Counterpart Application, PCT Application No. PCT/CN2014/092577, English Translation of International Search Report dated Aug. 26, 2015, 2 pages.

Foreign Communication From a Counterpart Application, PCT Application No. PCT/CN2014/092577, English Translation of Written Opinion dated Aug. 26, 2015, 5 pages.

Foreign Communication From a Counterpart Application, Chinese Application No. 201480026399.9, Chinese Office Action dated May 23, 2018, 5 pages.

* cited by examiner

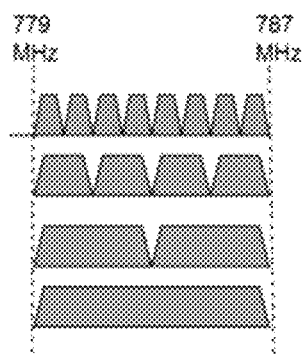
FIG. 1
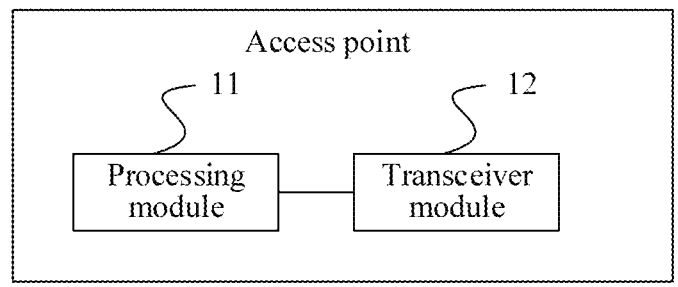
FIG. 2
| I frame interval response | Unsetting reason | Expected GOP value |
FIG. 3

| Element ID | Length | Information about a service stream | Nominal I frame MSDU length | Maximum I frame MSDU length | Nominal P frame MSDU length | Maximum P frame MSDU length | Minimum service interval | Maximum service interval | Inactive interval |
|---|---|---|---|---|---|---|---|---|---|

| Pause interval | Service start time | Minimum data rate | Average data rate | Peak data rate | Burst length | Latency threshold | Minimum PHY rate | Spare bandwidth tolerance | Media time |
|---|---|---|---|---|---|---|---|---|---|

FIG. 4

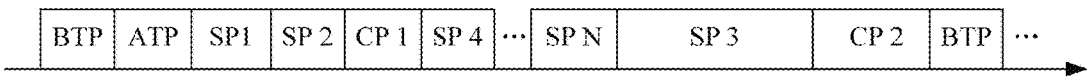
FIG. 5
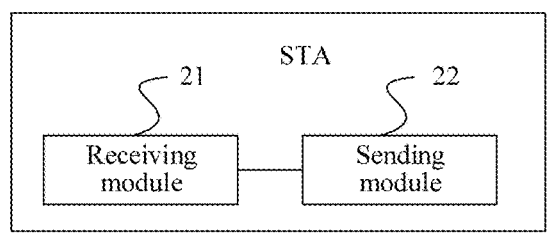
FIG. 6
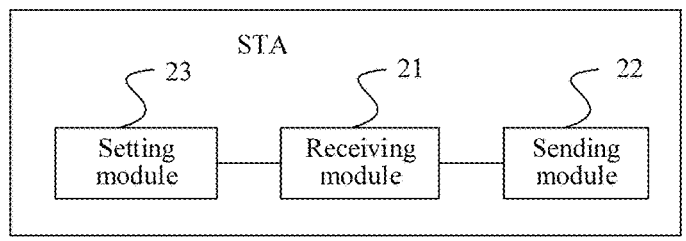
FIG. 7
FIG. 8
FIG. 9

MULTI-VIDEO STREAM TRANSMISSION METHOD AND DEVICE

CROSS-REFERENCE TO RELATED APPLICATIONS

This application is a continuation of International Patent Application No. PCT/CN2014/092577 filed on Nov. 28, 2014, which is hereby incorporated by reference in its entirety.

TECHNICAL FIELD

The present disclosure relates to communications technologies, and in particular, to a multi-video stream transmission method and a device.

BACKGROUND

A wireless local area network (WLAN) has advantages such as low costs and convenient deployment, and can meet technical and cost requirements of a wireless video surveillance network. In wireless video surveillance, people have increasing requirements for high-definition video streams. However, a high-definition video stream has a relatively high data rate, leading to relatively high network load when multiple video surveillance terminals concurrently transmit high-definition video streams. For example, a high-definition video conference in a 720p encoding format has a typical data rate of 0.5 megabits per second (Mbps) to 2.5 Mbps. Assuming that high-definition video streams in the 720p encoding format have an average rate of approximately 1.5 Mbps, an aggregate data rate of 15 video surveillance terminals reaches 22.5 Mbps. However, according to an 8-megahertz (MHz) channel modulation and coding scheme (MCS) design of a physical layer in the 802.11ah standard, even if the 15 stations (STAs) all can use high-order 64-quadrature amplitude modulation (QAM) (a bit rate is 2/3), a maximum value of an aggregate throughput of a network is still only 23.4 Mbps. Therefore, when a wireless high-definition video surveillance service is running on a frequency band of 779 MHz to 787 MHz that is allocated to China and that is below 1 gigahertz (GHz), because maximum usable bandwidth is finite, a wireless video surveillance network often runs in a saturated state. The wireless video surveillance network ran in the saturated state cannot have an excessively large load change range. Otherwise, a peak throughput of the network exceeds a load tolerance of the network.

In a wireless video surveillance application, a mainstream video coding standard is H.264, whose video coding outputs include an intra frame (I frame), a predictive frame (P frame), and a bi-directional interpolated prediction frame (B frame). Because the size of the I frame is generally 8 to 10 times that of the P frame and the B frame, when picture frame intervals are uniform, the I frame has a much higher encoding output rate than the P frame and the B frame. When multiple STAs send I frames at a same time or time close to each other, a network load peak rate is excessively high, and exceeds a network load tolerance. As a result, not all latency quality of service (QoS) requirements of multiple real-time video data streams can be met.

SUMMARY

Embodiments of the present disclosure provide a multi-video stream transmission method and a device such that I frame sending time of STAs are staggered, network load balance is achieved, and it is ensured that a latency of each STA meets a QoS requirement.

A first aspect of the present disclosure provides an access point, including a processing module configured to allocate initial sending time and sending periods of I frames to at least two STAs associated with the access point, where an interval between initial sending time of the I frames of any two STAs whose I frame sending time is adjacent of the at least two STAs is not equal to a difference between the I frame sending periods of the any two adjacent STAs, and the interval between the initial sending time of the I frames of the any two adjacent STAs is greater than 0, and a transceiver module configured to send an initial sending time and a sending period of an I frame to each STA of the at least two STAs, where the processing module is further configured to allocate an I frame service period and a P frame service period to each STA according to the initial sending time and the sending period of the I frame of each STA, where each STA exclusively occupies a channel in the I frame service period and the P frame service period, and an interval T between I frame service periods of the any two adjacent STAs meets the following condition $T_{min} \leq T \leq T_{max}$ where $T_{min}$ and $T_{max}$ are determined by the access point according to the initial sending time and the sending period of the I frame of each STA, and the transceiver module is further configured to send, to each STA, a result of allocating the I frame service period and the P frame service period to each STA.

With reference to the first aspect of the present disclosure, in a first possible implementation manner of the first aspect of the present disclosure, $T_{min}$ and $T_{max}$ are calculated using the following formulas:

$$T_{min} = \min\{|(|N_{GOP}(1) - N_{GOP}(2)|/F - |T_1 - T_2|)|, |T_1 - T_2|\}$$

and $$T_{max} = \max\{|(|N_{GOP}(1) - N_{GOP}(2)|/F - |T_1 - T_2|)|, |T_1 - T_2|\},$$

where $N_{GOP}(1)$ and $N_{GOP}(2)$ are lengths of groups of pictures (GOPs) of the any two adjacent STAs, F is a frame rate of the any two adjacent STAs, and $T_1$ and $T_2$ are the initial sending time of the I frames of the any two adjacent STAs.

With reference to the first aspect of the present disclosure and the first possible implementation manner of the first aspect of the present disclosure, in a second possible implementation manner of the first aspect of the present disclosure, the interval between the initial sending time of the I frames of the any two adjacent STAs is the same.

With reference to the second possible implementation manner of the first aspect of the present disclosure, in a third possible implementation manner of the first aspect of the present disclosure, the interval between the initial sending time of the I frames of the any two adjacent STAs is:

$$C_I = \frac{1}{\sum_i \frac{1}{N_{GOP}(i)}} \times \frac{1}{F},$$

where $N_{GOP}(i)$ is a length of a GOPs of an $i^{th}$ STA, $i=1, \ldots K$, K is a total quantity of STAs, and F is a frame rate of each STA.

With reference to the second and third possible implementation manners of the first aspect of the present disclosure, in a fourth possible implementation manner of the first aspect of the present disclosure, the processing module is further configured to request, when detecting that the interval between the initial sending time of the I frames of the any two adjacent STAs is equal to the difference between the I frame sending periods of the any two adjacent STAs, by sending an I frame interval request frame, at least one STA of the any two adjacent STAs to adjust an I frame sending period of the STA such that after the adjustment, the interval between the initial sending time of the I frames of the any two adjacent STAs is not equal to a difference between I frame sending periods of the any two adjacent STAs, or request, when detecting that a minimum value of the interval between the I frame service periods of the any two adjacent STAs $\min\{|(|N_{GOP}(1)-N_{GOP}(2)|/F-|T_1-T_2|)|, |T_1-T_2|\}$ is less than a preset interval threshold, by sending an I frame interval request frame, at least one STA of the any two adjacent STAs to adjust an I frame sending period of the STA such that after the adjustment, a minimum value of an interval between the I frame service periods of the any two adjacent STAs is not less than the interval threshold.

With reference to the first aspect of the present disclosure and the first to fourth possible implementation manners of the first aspect of the present disclosure, in a fifth possible implementation manner of the first aspect of the present disclosure, the transceiver module is further configured to separately send a first I frame interval setting request to each STA, where the first I frame interval setting request includes the initial sending time of each STA such that each STA sets its initial I frame sending time according to the initial sending time of each STA, receive a first I frame interval setting response returned by each STA, where the first I frame interval setting response includes an adjustment result of its initial I frame sending time, and send a second I frame interval setting request to each STA if the adjustment result of its initial I frame sending time indicates that each STA sets its initial I frame sending time according to the initial sending time included in the first I frame interval setting request, where the second I frame interval setting request includes the I frame sending period of each STA such that each STA adjusts the I frame sending period of each STA to the sending period included in the second I frame interval setting request.

With reference to the first aspect of the present disclosure and the first to fourth possible implementation manners of the first aspect of the present disclosure, in a sixth possible implementation manner of the first aspect of the present disclosure, the processing module is further configured to obtain an average length of I frames and an average length of P frames of each STA, and an average sending rate of each STA, separately calculate the I frame service period of each STA according to the average length of the I frames of each STA and the average sending rate of each STA, and separately calculate the P frame service period of each STA according to the average length of the P frames of each STA and the average sending rate of each STA, determine the interval between the I frame service periods of the any two adjacent STAs according to the initial sending time and the sending period of the I frame of each STA, and allocate the I frame service period and the P frame service period to each STA according to the I frame service period and the P frame service period of each STA and the interval between the I frame service periods of the any two adjacent STAs.

With reference to the first aspect of the present disclosure and the first to sixth possible implementation manners of the first aspect of the present disclosure, in a seventh possible implementation manner of the first aspect of the present disclosure, the processing module is further configured to allocate a channel contention period to each STA in each beacon interval, where the channel contention period is used by each STA to send data when each STA fails to completely send all buffered data in the I frame service period and the P frame service period of each STA, and the channel contention period is shared by each STA.

With reference to the seventh possible implementation manner of the first aspect of the present disclosure, in an eighth possible implementation manner of the first aspect of the present disclosure, the transceiver module is further configured to send contention period control signaling to each STA, where the contention period control signaling forbids some or all of the STAs to access the channel in a channel contention period before the first service periods in respective beacon intervals, and the first service period of each STA is the I frame service period or the P frame service period.

With reference to the first to eighth possible implementation manners of the first aspect of the present disclosure, in a ninth possible implementation manner of the first aspect of the present disclosure, the I frame service period allocated by the access point to each STA is greater than the P frame service period allocated to each STA.

With reference to the seventh or eighth possible implementation manner of the first aspect of the present disclosure, in a tenth possible implementation manner of the first aspect of the present disclosure, the processing module is further configured to set a reference user priority for each STA according to importance of a video surveillance area or surveillance content of each STA, and the transceiver module is further configured to send the reference user priority of each STA to each STA such that each STA sets a channel contention access parameter of the channel contention period and priorities of the I frame and the P frame according to the reference user priority of each STA.

With reference to the tenth possible implementation manner of the first aspect of the present disclosure, in an eleventh possible implementation manner of the first aspect of the present disclosure, the processing module is further configured to detect whether a motion change occurs in the video surveillance content of each STA, and if detecting that a motion change occurs in video surveillance content of any STA in the STAs, adjust an I frame service period and a P frame service period that are allocated to the STA, and adjust a reference user priority of the STA, where an I frame service period of the STA after the adjustment is greater than the I frame service period before the adjustment, a P frame service period of the STA after the adjustment is greater than the P frame service period before the adjustment, and a reference user priority of the STA after the adjustment is higher than the reference user priority before the adjustment, and the transceiver module is further configured to notify the STA of a result of the adjustment by the processing module.

With reference to the eleventh possible implementation manner of the first aspect of the present disclosure, in a twelfth possible implementation manner of the first aspect of the present disclosure, the processing module is further configured to resume the I frame service period, the P frame service period, and the reference user priority of the STA of the user after no motion change occurs in the video surveillance content of the STA, where an I frame service period of the STA after the resumption is equal to the I frame service period before the adjustment, a P frame service period of the STA after the resumption is equal to the P frame service period before the adjustment, and a reference user priority of the STA after the resumption is equal to the reference user priority before the adjustment, and the transceiver module is further configured to notify the STA of a result of the resumption by the processing module.

With reference to the first aspect of the present disclosure, in a thirteenth possible implementation manner of the first aspect of the present disclosure, when the access point sends the I frame or the P frame, an application layer of the access point adds a frame type parameter to the I frame and the P frame transferred to a Media Access Control (MAC) layer such that the MAC layer of the access point determines, according to the frame type parameter, whether a received data frame is the I frame or the P frame.

A second aspect of the present disclosure provides a STA, including a receiving module configured to receive an initial sending time and a sending period of an I frame that are sent by an access point, where the receiving module is further configured to receive a result, sent by the access point, of allocating an I frame service period and a P frame service period, where the I frame service period and the P frame service period are allocated by the access point to the STA in each beacon interval according to the initial sending time and the sending period of the I frame of the STA, and a sending module configured to send the I frame in the I frame service period and send the P frame in the P frame service period according to the initial sending time of the I frame and the I frame sending period.

With reference to the second aspect of the present disclosure, in a first possible implementation manner of the second aspect of the present disclosure, the receiving module is further configured to receive a first I frame interval setting request sent by the access point, where the first I frame interval setting request includes the initial sending time of the STA, and receive a second I frame interval setting request sent by the access point, where the second I frame interval setting request includes the I frame sending period of the STA.

With reference to the second aspect of the present disclosure, in a second possible implementation manner of the second aspect of the present disclosure, each beacon interval further includes a channel contention period allocated by the access point, when the STA fails to completely send all buffered data in the I frame service period and the P frame service period, the STA uses the channel contention period to send data, and the channel contention period is shared by all STAs associated with the access point.

With reference to the second possible implementation manner of the second aspect of the present disclosure, in a third possible implementation manner of the second aspect of the present disclosure, the receiving module is further configured to receive contention period control signaling sent by the access point, where the contention period control signaling forbids the STA to access a channel in a channel contention period before the first service period in each beacon interval, and the first service period of the STA is the I frame service period or the P frame service period.

With reference to the second or third possible implementation manner of the second aspect of the present disclosure, in a fourth possible implementation manner of the second aspect of the present disclosure, the STA further includes a setting module, where the receiving module is further configured to receive a reference user priority sent by the access point. The setting module is configured to set a channel contention access parameter of the channel contention period according to the reference user priority, and contend for the channel in the contention period according to the channel contention access parameter, and the setting module is further configured to set a priority of the I frame and a priority of the P frame according to the reference user priority, where the priority of the P frame is the same as the reference user priority, the priority of the I frame is higher than the priority of the P frame, and a priority of a retransmitted frame of the STA is higher than a priority of a non-retransmitted frame.

With reference to the fourth possible implementation manner of the second aspect of the present disclosure, in a fifth possible implementation manner of the second aspect of the present disclosure, the receiving module is further configured to receive a result of adjustment that is sent by the access point, where the result of the adjustment is sent by the access point after the access point detects a motion change of video surveillance content of the STA, and the result of the adjustment includes an I frame service period of the STA after the adjustment, a P frame service period of the STA after the adjustment, and a reference user priority of the STA after the adjustment, where the I frame service period of the STA after the adjustment is greater than the I frame service period before the adjustment, the P frame service period of the STA after the adjustment is greater than the P frame service period before the adjustment, and the reference user priority of the STA after the adjustment is higher than the reference user priority before the adjustment.

With reference to the fifth possible implementation manner of the second aspect of the present disclosure, in a sixth possible implementation manner of the second aspect of the present disclosure, the receiving module is further configured to receive a result of resumption that is sent by the access point, where the result of the resumption is sent by the access point after the access point detects that no motion change occurs in the video surveillance content of the STA, and the result of the resumption includes an I frame service period of the STA after the resumption, a P frame service period of the STA after the resumption, and a reference user priority of the STA after the resumption, where the I frame service period of the STA after the resumption is equal to the I frame service period before the adjustment, the P frame service period of the STA after the resumption is equal to the P frame service period before the adjustment, and the reference user priority of the STA after the resumption is equal to the reference user priority before the adjustment.

With reference to the second aspect of the present disclosure and the first or sixth possible implementation manner of the second aspect, in a seventh possible implementation manner of the second aspect of the present disclosure, the I frame service period allocated by the access point to the STA is greater than the P frame service period.

With reference to the second aspect of the present disclosure, in an eighth possible implementation manner of the second aspect of the present disclosure, when the STA sends the I frame or the P frame, an application layer of the STA adds a frame type parameter to the I frame and the P frame transferred to a MAC layer such that the MAC layer of the STA determines, according to the frame type parameter, whether a received data frame is the I frame or the P frame.

A third aspect of the present disclosure provides a multi-video stream transmission method, including allocating, by an access point, initial sending time and sending periods of I frames to at least two STAs associated with the access point, where an interval between initial sending time of I frames of any two STAs whose I frame sending time is adjacent of the at least two STAs is not equal to a difference between the I frame sending periods of the any two adjacent STAs, and the interval between the initial sending time of the I frames of the any two adjacent STAs is greater than 0, sending, by the access point, an initial sending time and a sending period of an I frame to each STA of the at least two STAs, allocating, by the access point, an I frame service period and a P frame service period to each STA according to the initial sending time and the sending period of the I frame of each STA, where each STA exclusively occupies a channel in the I frame service period and the P frame service period, and an interval T between the I frame service periods of the any two adjacent STAs meets the following condition $T_{min} \leq T \leq T_{max}$, where $T_{min}$ and $T_{max}$ are determined by the access point according to the initial sending time and the sending period of the I frame of each STA, and sending, by the access point to each STA, a result of allocating the I frame service period and the P frame service period to each STA.

With reference to the third aspect of the present disclosure, in a first possible implementation manner of the third aspect of the present disclosure, $T_{min}$ and $T_{max}$ are calculated using the following formulas:

$$T_{min} = \min\{|(|N_{GOP}(1) - N_{GOP}(2)|/F - |T_1 - T_2|)|, |T_1 - T_2|\}$$
and $$T_{max} = \max\{|(|N_{GOP}(1) - N_{GOP}(2)|/F - |T_1 - T_2|)|, |T_1 - T_2|\},$$

where $N_{GOP}(1)$ and $N_{GOP}(2)$ are lengths of GOPs of the any two adjacent STAs, F is a frame rate of the any two adjacent STAs, and $T_1$ and $T_2$ are the initial sending time of the I frames of the any two adjacent STAs.

With reference to the third aspect of the present disclosure and the first possible implementation manner of the third aspect of the present disclosure, in a second possible implementation manner of the third aspect of the present disclosure, the interval between the initial sending time of the I frames of the any two adjacent STAs is the same.

With reference to the second possible implementation manner of the third aspect of the present disclosure, in a third possible implementation manner of the third aspect of the present disclosure, the interval between the initial sending time of the I frames of the any two adjacent STAs is:

$$C_I = \frac{1}{\sum_i \frac{1}{N_{GOP}(i)}} \times \frac{1}{F},$$

where $N_{GOP}(i)$ is a length of a GOPs of an $i^{th}$ STA, $i=1, \ldots K$, K is a total quantity of STAs, and F is a frame rate of each STA.

With reference to the second and third possible implementation manners of the third aspect of the present disclosure, in a fourth possible implementation manner of the third aspect of the present disclosure, the method further includes requesting, when the access point detects that the interval between the initial sending time of the I frames of the any two adjacent STAs is equal to the difference between the I frame sending periods of the any two adjacent STAs, by the access point by sending an I frame interval request frame, at least one STA of the any two adjacent STAs to adjust an I frame sending period of the STA such that after the adjustment, the interval between the initial sending time of the I frames of the any two adjacent STAs is not equal to a difference between the I frame sending periods of the any two adjacent STAs, or requesting, when the access point detects that a minimum value of the interval between the I frame service periods of the any two adjacent STAs min$\{|(|N_{GOP}(1) - N_{GOP}(2)|/F - |T_1 - T_2|)|, |T_1 - T_2|\}$ is less than a preset interval threshold, by the access point by sending an I frame interval request frame, at least one STA of the any two adjacent STAs to adjust an I frame sending period of the STA such that after the adjustment, a minimum value of an interval between the I frame service periods of the any two adjacent STAs is not less than the interval threshold.

With reference to the third aspect of the present disclosure and the first to fourth possible implementation manners of the third aspect of the present disclosure, in a fifth possible implementation manner of the third aspect of the present disclosure, the sending, by the access point, an initial sending time and a sending period of an I frame to each STA include separately sending, by the access point, a first I frame interval setting request to each STA, where the first I frame interval setting request includes the initial sending time of each STA such that each STA sets its initial I frame sending time according to the initial sending time of each STA, receiving, by the access point, a first I frame interval setting response returned by each STA, where the first I frame interval setting response includes an adjustment result of its initial I frame sending time, and sending, by the access point, a second I frame interval setting request to each STA if the adjustment result of its initial I frame sending time indicates that each STA sets its initial I frame sending time according to the initial sending time included in the first I frame interval setting request, where the second I frame interval setting request includes the I frame sending period of each STA such that each STA adjusts the I frame sending period of each STA to the sending period included in the second I frame interval setting request.

With reference to the third aspect of the present disclosure and the first to fourth possible implementation manners of the third aspect of the present disclosure, in a sixth possible implementation manner of the third aspect of the present disclosure, allocating, by the access point, an I frame service period and a P frame service period to each STA according to the initial sending time and the sending period of the I frame of each STA includes obtaining, by the access point, an average length of I frames and an average length of P frames of each STA, and an average sending rate of each STA, separately calculating, by the access point, the I frame service period of each STA according to the average length of the I frames of each STA and the average sending rate of each STA, and separately calculating the P frame service period of each STA according to the average length of the P frames of each STA and the average sending rate of each STA, determining, by the access point, the interval between the I frame service periods of the any two adjacent STAs according to the initial sending time and the sending period of the I frame of each STA, and allocating, by the access point, the I frame service period and the P frame service period to each STA according to the I frame service period and the P frame service period of each STA and the interval between the I frame service periods of the any two adjacent STAs.

With reference to the third aspect of the present disclosure and the first to sixth possible implementation manners of the third aspect of the present disclosure, in a seventh possible implementation manner of the third aspect of the present disclosure, the method further includes allocating, by the access point, a channel contention period to each STA in each beacon interval, where the channel contention period is used by each STA to send data when each STA fails to completely send all buffered data in the I frame service period and the P frame service period of each STA, and the channel contention period is shared by each STA.

With reference to the seventh possible implementation manner of the third aspect of the present disclosure, in an eighth possible implementation manner of the third aspect of the present disclosure, the method further includes sending, by the access point, contention period control signaling to each STA, where the contention period control signaling forbids some or all of the STAs to access the channel in a channel contention period before the first service periods in respective beacon intervals, and the first service period of each STA is the I frame service period or the P frame service period.

With reference to the first to eighth possible implementation manners of the third aspect of the present disclosure, in a ninth possible implementation manner of the third aspect of the present disclosure, the I frame service period allocated by the access point to each STA is greater than the P frame service period allocated to each STA.

With reference to the seventh or eighth possible implementation manner of the third aspect of the present disclosure, in a tenth possible implementation manner of the third aspect of the present disclosure, the method further includes setting, by the access point, a reference user priority for each STA according to importance of a video surveillance area or surveillance content of each STA, and sending, by the access point, the reference user priority of each STA to each STA such that each STA sets a channel contention access parameter of the channel contention period and priorities of the I frame and the P frame according to the reference user priority of each STA.

With reference to the tenth possible implementation manner of the third aspect of the present disclosure, in an eleventh possible implementation manner of the third aspect of the present disclosure, the method further includes detecting, by the access point, whether a motion change occurs in the video surveillance content of each STA, adjusting, by the access point, an I frame service period and a P frame service period that are allocated to the STA, and adjusting a reference user priority of the STA if the access point detects that a motion change occurs in video surveillance content of any STA in the STAs, where an I frame service period of the STA after the adjustment is greater than the I frame service period before the adjustment, a P frame service period of the STA after the adjustment is greater than the P frame service period before the adjustment, and a reference user priority of the STA after the adjustment is higher than the reference user priority before the adjustment, and notifying, by the access point, the STA of a result of the adjustment.

With reference to the eleventh possible implementation manner of the third aspect of the present disclosure, in a twelfth possible implementation manner of the third aspect of the present disclosure, the method further includes resuming, by the access point, the I frame service period, the P frame service period, and the reference user priority of the STA of the user after no motion change occurs in the video surveillance content of the STA, where an I frame service period of the STA after the resumption is equal to the I frame service period before the adjustment, a P frame service period of the STA after the resumption is equal to the P frame service period before the adjustment, and a reference user priority of the STA after the resumption is equal to the reference user priority before the adjustment, and notifying, by the access point, the STA of a result of the resumption.

With reference to the third aspect of the present disclosure, in a thirteenth possible implementation manner of the third aspect of the present disclosure, when the access point sends the I frame or the P frame, an application layer of the access point adds a frame type parameter to the I frame and the P frame transferred to a MAC layer such that the MAC layer of the access point determines, according to the frame type parameter, whether a received data frame is the I frame or the P frame.

A fourth aspect of the present disclosure provides a multi-video stream transmission method, including receiving, by a STA, an initial sending time and a sending period of an I frame that are sent by an access point, receiving, by the STA, a result, sent by the access point, of allocating an I frame service period and a P frame service period, where the I frame service period and the P frame service period are allocated by the access point to the STA in each beacon interval according to the initial sending time and the sending period of the I frame of the STA, and sending, by the STA, the I frame in the I frame service period and sending the P frame in the P frame service period according to the initial sending time of the I frame and the I frame sending period.

With reference to the fourth aspect of the present disclosure, in a first possible implementation manner of the fourth aspect of the present disclosure, receiving, by a STA, an initial sending time and a sending period of an I frame that are sent by an access point includes receiving, by the STA, a first I frame interval setting request sent by the access point, where the first I frame interval setting request includes the initial sending time of the STA, and receiving, by the STA, a second I frame interval setting request sent by the access point, where the second I frame interval setting request includes the I frame sending period of the STA.

With reference to the fourth aspect of the present disclosure, in a second possible implementation manner of the fourth aspect of the present disclosure, each beacon interval further includes a channel contention period allocated by the access point, when the STA fails to completely send all buffered data in the I frame service period and the P frame service period, the STA uses the channel contention period to send data, and the channel contention period is shared by all STAs associated with the access point.

With reference to the second possible implementation manner of the fourth aspect of the present disclosure, in a third possible implementation manner of the fourth aspect of the present disclosure, the method further includes receiving, by the STA, contention period control signaling sent by the access point, where the contention period control signaling is used to forbid the STA to access a channel in a channel contention period before the first service period in each beacon interval, and the first service period of the STA is the I frame service period or the P frame service period.

With reference to the second or third possible implementation manner of the fourth aspect of the present disclosure, in a fourth possible implementation manner of the fourth aspect of the present disclosure, the method further includes receiving, by the STA, a reference user priority sent by the access point, setting, by the STA, a channel contention access parameter of the channel contention period according to the reference user priority, and contending for the channel in the contention period according to the channel contention access parameter, and setting, by the STA, a priority of the I frame and a priority of the P frame according to the reference user priority, where the priority of the P frame is the same as the reference user priority, the priority of the I frame is higher than the priority of the P frame, and a priority of a retransmitted frame of the STA is higher than a priority of a non-retransmitted frame.

With reference to the fourth possible implementation manner of the fourth aspect of the present disclosure, in a fifth possible implementation manner of the fourth aspect of the present disclosure, the method further includes receiving, by the STA, a result of adjustment that is sent by the access point, where the result of the adjustment is sent by the access point after the access point detects a motion change of video surveillance content of the STA, and the result of the adjustment includes an I frame service period of the STA after the adjustment, a P frame service period of the STA after the adjustment, and a reference user priority of the STA after the adjustment, where the I frame service period of the STA after the adjustment is greater than the I frame service period before the adjustment, the P frame service period of the STA after the adjustment is greater than the P frame service period before the adjustment, and the reference user priority of the STA after the adjustment is higher than the reference user priority before the adjustment.

With reference to the fifth possible implementation manner of the fourth aspect of the present disclosure, in a sixth possible implementation manner of the fourth aspect of the present disclosure, the method further includes receiving, by the STA, a result of resumption that is sent by the access point, where the result of the resumption is sent by the access point after the access point detects that no motion change occurs in the video surveillance content of the STA, and the result of the resumption includes an I frame service period of the STA after the resumption, a P frame service period of the STA after the resumption, and a reference user priority of the STA after the resumption, where the I frame service period of the STA after the resumption is equal to the I frame service period before the adjustment, the P frame service period of the STA after the resumption is equal to the P frame service period before the adjustment, and the reference user priority of the STA after the resumption is equal to the reference user priority before the adjustment.

With reference to the fourth aspect of the present disclosure and the first or sixth possible implementation manner of the fourth aspect, in a seventh possible implementation manner of the fourth aspect of the present disclosure, the I frame service period allocated by the access point to the STA is greater than the P frame service period.

With reference to the fourth aspect of the present disclosure, in an eighth possible implementation manner of the fourth aspect of the present disclosure, the method further includes when the STA sends the I frame or the P frame, an application layer of the STA adds a frame type parameter to the I frame and the P frame transferred to a MAC layer such that the MAC layer of the STA determines, according to the frame type parameter, whether a received data frame is the I frame or the P frame.

Using the multi-video stream transmission method and the device in the embodiments of the present disclosure, an access point sets initial sending time and sending periods of the I frames of at least two STAs associated with the access point such that an interval between initial sending time of the I frames of any two STAs whose I frame sending time is adjacent is not equal to a difference between the I frame sending periods of the any two adjacent STAs, and allocates an I frame service period and a P frame service period to each STA according to an initial sending time and a sending period of an I frame of each STA, where each STA exclusively occupies a channel in the I frame service period and the P frame service period. As a result, the I frame sending time of the STAs are staggered, network load balance is achieved, it is ensured that network load is kept within a network load tolerance, and it is ensured that a latency of each STA meets a QoS requirement.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and a person of ordinary skill in the art may still derive other drawings from these accompanying drawings without creative efforts.

FIG. 1 is a schematic diagram of radio channel division;

FIG. 2 is a schematic structural diagram of an access point according to Embodiment 1 of the present disclosure;

FIG. 3 shows a format of an interval report field of an I frame;

FIG. 4 is a schematic structural diagram of a video traffic specification (VTSPEC) element;

FIG. 5 is a schematic diagram of a result of allocating an I frame service period and a P frame service period;

FIG. 6 is a schematic structural diagram of a priority allocation element of a STA;

FIG. 7 is a schematic structural diagram of a motion detection report element;

FIG. 8 is a schematic structural diagram of a STA according to Embodiment 4 of the present disclosure;

FIG. 9 is a schematic structural diagram of a STA according to Embodiment 5 of the present disclosure;

DESCRIPTION OF EMBODIMENTS

Figure 10:
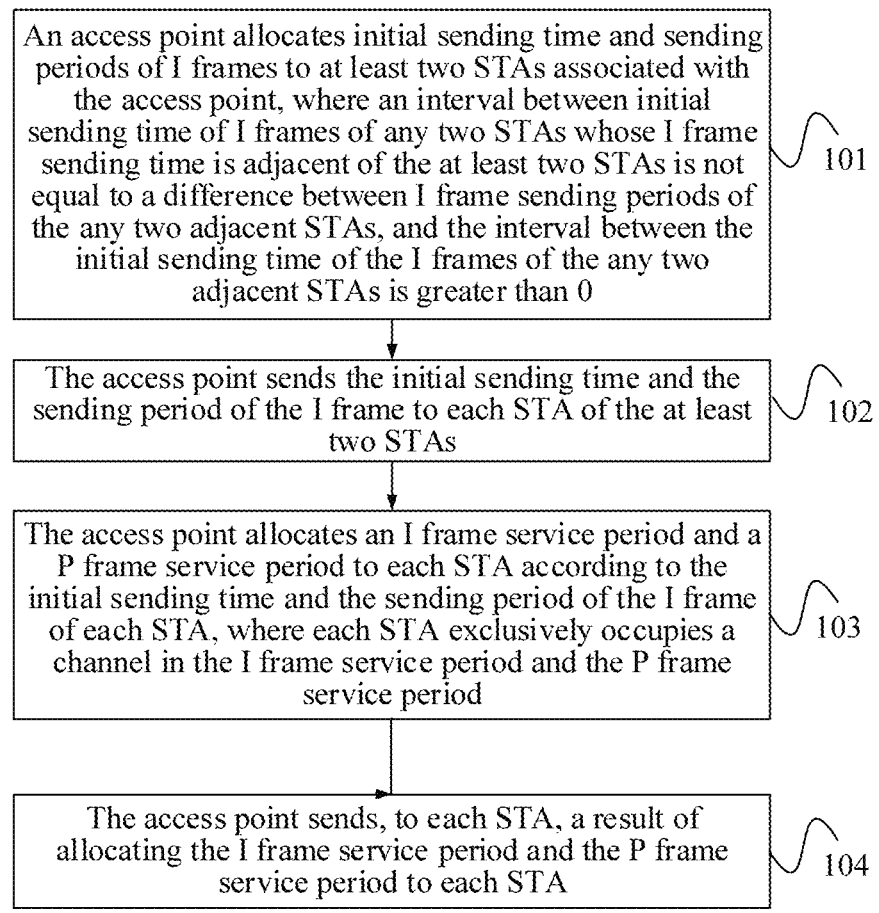
FIG. 10 is a flowchart of a multi-video stream transmission method according to Embodiment 6 of the present disclosure.

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Methods in the embodiments of the present disclosure are applied to the field of wireless video surveillance. The wireless personal area network (WPAN) standard working group has already begun to formulate a video personal area network (VPAN) standard for wireless video surveillance and other applications. The standard focuses on indoor and outdoor wireless high-definition video surveillance applications, and aims at formulating a national standard for a wireless video surveillance network that is a moderate-scale network and that supports concurrent transmission of multiple high-definition video streams. 802.11ah divides a frequency band of 779 MHz to 787 MHz of China into eight 1-MHz channels, four 2-MHz channels, two 4-MHz channels, and one 8-MHz channel, as shown in FIG. 1. FIG. 1 is a schematic diagram of radio channel division. In addition, 802.11ah further divides a frequency band of 755 MHz to 779 MHz of China into 24 channels whose bandwidth is 1 MHz. According to the channel division method of 802.11ah, maximum channel bandwidth in China of 1-GHz-below Internet of Things frequency bands applied to various control devices is only 8 MHz (the frequency band of 779 MHz to 787 MHz).

Because maximum usable bandwidth of the VPAN is finite (779 MHz to 787 MHz), the network is prone to saturate when multiple video surveillance terminals concurrently transmit high-definition video streams. In a WLAN, a video surveillance terminal is generally a STA. For example, a high-definition video conference in a 720p encoding format has a typical data rate of 0.5 Mbps to 2.5 Mbps. Assuming that high-definition video streams in the 720p encoding format have an average rate of approximately 1.5 Mbps, an aggregate data rate of 15 STAs reaches 22.5 Mbps. However, according to an 8-MHz bandwidth MCS design of a physical layer in 802.11ah, even if the 15 STAs all can use high-order 64-QAM (a bit rate is 2/3), a maximum value of an aggregate throughput of the network is still only 23.4 Mbps. Therefore, limited by bandwidth and heavy service load, the VPAN network often runs in a saturated state. In this case, an excessively large network load change easily results in a load tolerance of the networkbeing exceeded. In addition, high-definition video stream compression coding includes constant bit rate (CBR) and variable bit rate (VBR) coding formats, and quality of the CBR video compression coding is lower than that of the VBR video compression coding. For the VBR video compression coding, a data rate is closely related to a change speed of surveillance content, and for a surveillance picture that changes relatively fast, a video stream rate presents a large change range.

H.264 is a mainstream video coding standard widely applied in the industry, whose video coding outputs include an I frame, a P frame, and a B frame. The I frame is used as a reference frame, and is a basis for decoding the P and B frames. Therefore, importance of the I frame is higher than that of the P frame and the B frame. According to an empirical value, the size of the I frame is generally 8 to 10 times the size of the P frame and the B frame. Therefore, when frame intervals are uniform, the I frame has a much higher encoding output rate than the P frame and the B frame. As a bi-directional interpolated prediction frame, the B frame is not suitable for a real-time application, and generally is not used in video coding of a video surveillance application. In a wireless video surveillance network, if different STAs send I frames at the same time or time close to each other, a network load peak rate is excessively high, and exceeds a network load tolerance. As a result, latencies of some or all STAs cannot meet a QoS requirement.

To resolve the problem in other approaches, Embodiment 1 of the present disclosure provides an access point. FIG. 2 is a schematic structural diagram of the access point according to Embodiment 1 of the present disclosure. As shown in FIG. 2, the access point provided in this embodiment includes a processing module 11 and a transceiver module 12.

The processing module 11 is configured to allocate initial sending time and sending periods of the I frames to at least two STAs associated with the access point. An interval between initial sending time of the I frames of any two STAs whose I frame sending time is adjacent of the at least two STAs is not equal to a difference between the I frame sending periods of the any two adjacent STAs, and the interval between the initial sending time of the I frames of the any two adjacent STAs is greater than 0.

An access point is a network side device that can provide a wireless signal receiving and sending service to a STA. A wireless signal provided by each access point can cover a particular location range, a STA in the coverage range accesses a network using the access point, and the access point and multiple STAs connected to the access point form a basic service set (BSS). In this embodiment, the STAs associated with the access point refer to STAs in a BSS of the access point.

An I frame is sent periodically. In this embodiment, an initial sending time of an I frame of each STA refers to a sending time of the first I frame when I frames of each STA are sent according to a particular sending period. The access point sets the initial sending time and a sending period for the I frame of each STA such that the I frame sending times of the STAs are staggered. In this embodiment, the initial sending time of the I frame of each STA needs to meet the following condition. In the STAs, an interval between the initial sending times of the I frames of any two STAs whose I frame sending time is adjacent is not equal to a difference between the I frame sending periods of the any two adjacent STAs. In this embodiment, the any two adjacent STAs refer to two STAs whose I frame sending time is adjacent.

It is assumed that the any two STAs are STA 1 and STA 2, I frame sending time of STA 1 and STA 2 are respectively $t_1$ and $t_2$, and $t_1 = m\, N_{GOP}(1)/F + T_1$, $t_2 = n\, N_{GOP}(2)/F + T_2$. m represents a sequence number of an I frame sending period of STA 1, a value of m is m=0, 1, 2, . . . n represents a sequence number of an I frame sending period of STA 2, a value of n is n=0, 1, 2, . . . . $N_{GOP}(1)$ and $N_{GOP}(2)$ are respectively lengths of GOPs of STA 1 and STA 2. A GOP represents a value indicating how many picture frames have one I frame appearing, and a unit of the GOP is a quantity. F is a frame rate of STA 1 and STA 2, and $T_1$ and $T_2$ are respectively the initial sending time of the I frames of STA 1 and STA 2. An interval between the I frame sending time of STA 1 and STA 2 is:

$$t_1 - t_2 = (mN_{GOP}(1)/F + T_1) - (nN_{GOP}(2)/F + T_2).$$

When $m = n \pm 1$, a minimum value of the interval between the I frame sending time of STA 1 and STA 2 is:

$$\min(|t_1 - t_2|) = (|N_{GOP}(1) - N_{GOP}(2)|/F - |T_1 - T_2|).$$

The minimum value of the interval between the I frame sending time of STA 1 and STA 2 is an interval between the initial sending time of STA 1 and STA 2.

For $\min(t_1 - t_2) > 0$, $|N_{GOP}(1) - N_{GOP}(2)|/F \neq |T_1 - T_2|$ should be met, that is, a difference between the initial sending time of the I frames of STA 1 and STA 2 should not be equal to a difference between the I frame sending periods of STA 1 and STA 2.

Optionally, the interval between the initial sending time of the I frames of the any two adjacent STAs is the same. Certainly, the interval between the initial sending time of the I frames of the any two adjacent STAs may alternatively be different. As the interval between the initial sending time of the I frames of the any two adjacent STAs is set to the same, I frame sending time of the STAs are distributed uniformly.

Optionally, when GOPs of the I frames of the STAs are different, the interval between the initial sending time of the I frames of the any two adjacent STAs is:

$$C_I = \frac{1}{\sum_i \frac{1}{GOP(i)}} \times \frac{1}{F},$$

where GOP(i) is a length of a GOP of an $i^{th}$ STA, i=1, ... K, K is a total quantity of STAs, and F is a frame rate of each STA. Certainly, a preset frame interval may alternatively be determined in another manner. In this embodiment, the example is merely for description, and not for limitation thereto.

If the GOPs of the I frames of the STAs are the same, the interval between the initial sending time of the I frames of the any two adjacent STAs is:

$$C_I = \frac{N_{GOP}(i)}{K} \times \frac{1}{F}.$$

For example, assuming that the frame rate of the STAs is 30 frames per second (fps), the GOP values of the STAs are all 20, and a quantity of the STAs is 10, the access point may allocate a service period to STA i per $\frac{1}{15}$ second for transmitting an I frame.

The transceiver module 12 is configured to send the initial sending time and the sending period of the I frame to each STA of the at least two STAs.

After the processing module 11 allocates the initial sending time and the sending period to each STA, the transceiver module 12 notifies each STA. Further, the transceiver module 12 is configured to first, separately send a first I frame interval setting request to each STA. The first I frame interval setting request includes the initial sending time of each STA such that each STA sets the initial sending time of the I frame of each STA according to the initial sending time of each STA. After setting the initial sending time of the I frame of each STA, each STA returns a first I frame interval setting response to the access point.

Table 1 is a schematic diagram of a frame format of a first I frame interval setting request. As shown in Table 1, the first I frame interval setting request includes four fields, indicating a type, an action, a session token, and a new I frame generation interval. The type is used to indicate a type of the first I frame interval setting request. The session token field is set to a value selected by a STA that sends the frame in order to uniquely identify the session. The new I frame interval field instructs the STA to immediately adjust an I frame interval used in current video compression coding to a value of the new I frame interval field after receiving a frame interval setting request frame. The access point may set the value of the new I frame interval field according to a difference between a sending time of the I frame interval setting request frame and an expected initial sending time of an I frame of the STA.

TABLE 1

| Sequence | Information |
|---|---|
| 1 | Type |
| 2 | Action |
| 3 | Session token |
| 4 | New I frame interval field |

Then, the transceiver module 12 is configured to receive the first I frame interval setting response returned by each STA. The first I frame interval setting response includes an adjustment result of the initial sending time of the I frame of each STA. The STA may or may not set, as instructed by the access point, the initial sending time to the initial sending time included in the first I frame interval setting request.

Regardless of whether the STA sets the initial sending time of the I frame of the STA according to the initial sending time in the first I frame interval setting request, the STA returns a first I frame interval setting response to the access point. Table 2 shows a frame format of a first I frame interval setting response. As shown in Table 2, the first I frame interval setting response also includes four fields, a type, an action, a session token, and an I frame interval report.

TABLE 2

| Sequence | Information |
|---|---|
| 1 | Type |
| 2 | Action |
| 3 | Session token |
| 4 | New I frame interval report |

FIG. 3 shows a format of the I frame interval report field. The I frame interval report field includes three fields, an I frame interval response, an unsetting reason, and an expected GOP value. The I frame interval response field occupies one bit. When a value of the I frame interval response field is 1, it indicates that a STA already sets an initial sending time of an I frame of the STA according to an initial sending time in a first I frame interval setting request, and the unsetting reason field is retained. When the value of the I frame interval response field is not 1, it indicates that the STA does not set the initial sending time of the I frame of the STA according to the initial sending time in the first I frame interval setting request, a value of the unsetting reason field is a reason that the STA does not perform the setting, and the expected GOP value field is a GOP value expected by the STA.

If the adjustment result of the initial sending time of the I frame of each STA indicates that each STA sets the initial sending time of the I frame of each STA according to the initial sending time included in the first I frame interval setting request, the transceiver module 12 sends a second I frame interval setting request to each STA. The second I frame interval setting request includes the I frame sending period of each STA such that each STA adjusts the I frame sending period of each STA to the sending period included in the second I frame interval setting request.

A frame format of the second I frame interval setting request is the same as that of the first I frame interval setting request. A difference is that, a value of a new I frame generation interval field of the second I frame interval setting request is the I frame sending period of the STA.

The processing module 11 is further configured to allocate an I frame service period and a P frame service period to each STA according to the initial sending time and the sending period of the I frame of each STA. Each STA exclusively occupies a channel in the I frame service period and the P frame service period. An interval T between I frame service periods of the any two adjacent STAs meets the condition $T_{min} \leq T \leq T_{max}$. $T_{min}$ and $T_{max}$ are determined by the access point according to the initial sending time and the sending period of the I frame of each STA.

The interval T between the I frame service periods of the any two adjacent STAs meets the condition $T_{min} \leq T \leq T_{max}$.

$T_{min}$ and $T_{max}$ are determined by the access point according to the initial sending time and the sending period of the I frame of each STA.

Further, $T_{min}$ and $T_{max}$ are calculated using the following formulas:

$$T_{min}=\min\{|(|N_{GOP}(1)-N_{GOP}(2)|/F-|T_1-T_2|)|,|T_1-T_2|\}$$
and
$$T_{max}=\max\{|(|N_{GOP}(1)-N_{GOP}(2)|/F-|T_1-T_2|)|,|T_1-T_2|\},$$

where $N_{GOP}(1)$ and $N_{GOP}(2)$ are respectively lengths of GOPs of the any two adjacent STAs, F is a frame rate of the any two adjacent STAs, and $T_1$ and $T_2$ are respectively the initial sending time of the I frames of the any two adjacent STAs. A sum of the sending time of the data frames in a GOPs of a STA is equal to a length of a sending period of the STA.

In this embodiment, the processing module 11 allocates I frame service periods and P frame service periods to the STAs according to the initial sending time and the sending periods of the I frames of the STAs. The I frame service periods of the STAs do not overlap in time, and the P frame service periods of the STAs do not overlap in time, either. The I frame service period and the P frame service period of each STA are contention free timeslots, and each STA exclusively occupies a channel in the I frame service period and the P frame service period. Values of the I frame service period and the P frame service period of each STA may be set according to an actual requirement. Generally, the size of an I frame of a STA is 8 to 10 times that of a P frame. Therefore, during setting, the access point may set that the I frame service period of the STA is greater than the P frame service period of the STA. Certainly, the value of the I frame service period of the STA may alternatively be the same as that of the P frame service period of the STA. The present disclosure sets no limitation thereto.

In this embodiment, an interval between the I frame service periods allocated by the processing module 11 to the STA needs to meet a particular condition A minimum value of the interval between the I frames of the any two adjacent STAs is $\min\{|(|N_{GOP}(1)-N_{GOP}(2)|/F-|T_1-T_2|)|, |T_1-T_2|\}$, and a maximum value of the interval between the I frames of the any two adjacent STAs is:

$$\max(|t_1-t_2|)=\max\{(|N_{GOP}(1)-N_{GOP}(2)|/F-|T_1-T_2|)|, |T_1-T_2|\}.$$

$|T_1-T_2|$ represents the interval between the initial sending time of the I frames of the any two adjacent STAs, and $|N_{GOP}(1)-N_{GOP}(2)|/F$ is the difference between the I frame sending periods of the any two adjacent STAs.

The transceiver module 12 is further configured to send, to each STA, a result of allocating the I frame service period and the P frame service period to each STA.

After the processing module 11 allocates the I frame service period and the P frame service period to each STA, the transceiver module 12 notifies each STA of the allocation result. Each STA sends the I frame in the I frame service period allocated to each STA and sends the P frame in the P frame service period allocated to each STA, and does not need to perform channel contention.

In the access point in this embodiment, a processing module sets an initial sending time and a sending period of an I frame of each STA associated with the access point such that an interval between the initial sending time of I frames of any two STAs whose I frame sending time is adjacent is not equal to a difference between the I frame sending periods of the any two adjacent STAs, and allocates an I frame service period and a P frame service period to each STA according to the initial sending time and the sending period of the I frame of each STA. Each STA exclusively occupies a channel in the I frame service period and the P frame service period such that the I frame sending times of STAs are staggered, network load balance is achieved, and it is ensured that a latency of each STA meets a QoS requirement.

Embodiment 2 of the present disclosure further provides an access point. For a structure of the access point in this embodiment, refer to the schematic structural diagram of the access point in Embodiment 1. In the access point provided in this embodiment, based on the access point provided in Embodiment 1, the processing module 11 is further configured to obtain an average length of I frames and an average length of P frames of each STA, and an average sending rate of each STA.

Further, the processing module 11 receives a VTSPEC element sent by each STA. The VTSPEC element includes a nominal length and a maximum length of an I frame, a nominal length and a maximum length of a P frame, and an average sending rate that are of a corresponding STA. The access point determines the average length of the I frames of each STA according to the nominal length and the maximum length of the I frame of each STA, and determines the average length of the P frames of each STA according to the nominal length and the maximum length of the P frame of each STA.

Because a traffic specification (TSPEC) element in the 802.11 standard cannot distinguish features of an I frame and a P frame of a video stream, in this embodiment, the TSPEC element is modified, and a TSPEC element after the modification is a VTSPEC element. A MAC service data unit (MSDU) related parameter that is carried in the VTSPEC element can distinguish the I frame and the P frame. FIG. 4 is a schematic structural diagram of a VTSPEC element. The VTSPEC element sequentially includes the following fields. An element identifier (ID), a length, information about a service stream, a nominal I frame MSDU length, a maximum I frame MSDU length, a nominal P frame MSDU length, a maximum P frame MSDU length, a minimum service interval, a maximum service interval, an inactive interval, a pause interval, a service start time, a minimum data rate, an average data rate, a peak data rate, a burst length, a latency threshold, a minimum PHY rate, a spare bandwidth tolerance, and a media time.

The nominal I frame MSDU length field includes an unsigned integer in order to specify a nominal size of an MSDU or an A-MSDU of an I frame belonging to the service stream, and is in unit of octet. The maximum I frame MSDU length field includes an unsigned integer in order to specify a maximum size of an MSDU or an A-MSDU of an I frame belonging to the service stream, and is in unit of octet. Similarly, the nominal P frame MSDU length field and the maximum P frame MSDU length field also include unsigned integers in order to specify a nominal size or a maximum value of an MSDU or an A-MSDU of a P frame belonging to the service stream, and are in unit of octet.

The processing module 11 is further configured to separately calculate the I frame service period of each STA according to the average length of the I frames of each STA and the average sending rate of each STA, and separately calculate the P frame service period of each STA according to the average length of the P frames of each STA and the average sending rate of each STA.

The processing module 11 may calculate the I frame service period and the P frame service period according to the following formulas:

$$T_I(i)=D_I(i)/R(i) \text{ and } T_P(i)=D_P(i)/R(i),$$

where $T_I(i)$ is a length of an I frame service period of the $i^{th}$ STA, $D_I(i)$ is an average length of I frames of the $i^{th}$ STA, $T_P(i)$ is a length of a P frame service period of the $i^{th}$ STA, $D_P(i)$ is an average length of P frames of the $i^{th}$ STA, and $R(i)$ is an average sending rate of the $i^{th}$ STA.

The processing module 11 is further configured to determine the interval between the I frame service periods of the any two adjacent STAs according to the initial sending time and the sending period of the I frame of each STA.

In this embodiment, the minimum value of the interval between the I frame service periods of the any two adjacent STAs is $\min\{|(|N_{GOP}(1)-N_{GOP}(2)|/F-|T_1-T_2|)|, |T_1-T_2|\}$, and the maximum value of the interval between the I frame service periods of the any two adjacent STAs is $\max\{|(|N_{GOP}(1)-N_{GOP}(2)|/F-|T_1-T_2|)|, |T_1-T_2|\}$. The interval between the I frame service periods of the any two adjacent STAs needs to be only greater than or equal to the minimum value and less than or equal to the maximum value. Optionally, in this embodiment, the interval between the I frame service periods of the any two adjacent STAs is the same. For a manner of calculating the interval between the I frame service periods, refer to a related description in Embodiment 1. Details are not described again herein.

The processing module 11 is further configured to allocate the I frame service period and the P frame service period to each STA according to the I frame service period and the P frame service period of each STA and the interval between the I frame service periods of the any two adjacent STAs.

Further, in this embodiment, the processing module 11 is further configured to allocate a channel contention period to each STA in each beacon interval. The allocation may be further performed by an allocation unit (not shown). The channel contention period is used by each STA to send data when each STA fails to completely send all buffered data in the I frame service period and the P frame service period of each STA, and the channel contention period is shared by each STA. Optionally, the channel contention period may be allocated in advance by the access point in the BI, or may be a time after some STAs whose load is relatively light release remaining I frame service periods and/or P frame service periods.

Optionally, when the processing module 11 allocates the channel contention period in the BI, the transceiver module 12 is further configured to send contention period control signaling to each STA. The contention period control signaling is used to forbid some STAs or all STAs in the STAs to access the channel in a channel contention period before the first service periods in respective BIs. The first service period of each STA is the I frame service period or the P frame service period. As the contention period control signaling is sent, a collision caused because a large quantity of STAs send data in a same channel contention period can be avoided. The contention period control signaling is included in a control field in a scheduling element used when the AP schedules the service period for the STA, and is indicated by one bit. When the contention period control signaling is set to 1, it indicates that the STA is forbidden to access the channel in a channel contention period before the first service period of the STA. Otherwise, the STA is allowed to access the channel in the channel contention period before the first service period of the STA.

In this embodiment, when the processing module 11 allocates the I frame and P frame service periods to each STA in each BI, $$\sum_{i=1}^{k} T_I(i) + \sum_{i=1}^{k} T_P(i) \le C \cdot T_{BI}$$

should be met, where $T_{BI}$ is a length of a BI, C is a proportionality coefficient, $T_I(i)$ represents a length of an I frame of the $i^{th}$ STA, $T_P(i)$ represents a length of a P frame of the $i^{th}$ STA, i=1, 2 ..., K, C is related to a dynamic range of a rate of the STA, a larger rate change range of the STA indicates a smaller value of C, and a smaller rate change range of the STA indicates a larger value of C.

When C is less than 1, a remaining time that is in the BI and that is not allocated as a service period may be allocated as a channel contention period, that is, a length of the channel contention period is $(1-C) \cdot T_{BI}$ such that some STAs having relatively large rate change ranges may use the channel contention period to send data when sending requirements cannot be met in I frame and P frame service periods. The channel contention period is shared by each STA, and the STA contends for the channel in a channel contention period for data sending. When C is equal to 1, all time in the BI are allocated as service periods, and no channel contention period is reserved.

FIG. 5 is a schematic diagram of a result of allocating an I frame service period and a P frame service period. As shown in FIG. 5, a BTP is a beacon transmission period, and an ATP represents an announce transmission period. The ATP optionally appears in each BI, and is used for polling and exchange of a command frame and a control frame between the access point and each STA. SP 1 is a P frame service period of STA 1, SP 2 is a P frame service period of STA 2, SP N is a P frame service period of STA N, SP 3 is an I frame service period of STA 3, and CP 1 and CP 2 are channel contention periods. In FIG. 5, STA 3, STA 4 ... STA N are forbidden to use CP 1, but STA 1 and STA 2 can use CP 1.

The processing module 11 is further configured to request, when detecting that the interval between the initial sending time of the I frames of the any two adjacent STAs is equal to the difference between the I frame sending periods of the any two adjacent STAs, by sending an I frame interval request frame, at least one STA of the any two adjacent STAs to adjust an I frame sending period of the STA such that after the adjustment, the interval between the initial sending time of the I frames of the any two adjacent STAs is not equal to a difference between I frame sending periods of the any two adjacent STAs, or request, when detecting that the minimum value of the interval between the I frame service periods of the any two adjacent STAs $\min\{|(|N_{GOP}(1)-N_{GOP}(2)|/F-|T_1-T_2|)|, |T_1-T_2|\}$ is less than a preset interval threshold, by sending an I frame interval request frame, at least one STA of the any two adjacent STAs to adjust an I frame sending period of the STA such that after the adjustment, a minimum value of an interval between I frame service periods of the any two adjacent STAs is not less than the interval threshold.

In this embodiment, the processing module 11 sets an initial sending time and a sending period of an I frame of each STA associated with the access point, and allocates an I frame service period, a P frame service period, and a channel contention period to each STA in a BI according to the initial sending time and the sending period of the I frame of each STA. Each STA exclusively occupies a channel in the I frame service period and the P frame service period, and each STA contends for the channel in the channel contention period such that the I frame sending times of STAs are staggered, network load balance is achieved, it is ensured that network peak load does not exceed a network load tolerance, and it is ensured that a latency of each STA meets a QoS requirement. In addition, as the channel contention period is allocated to the STA in the BI, each STA whose length of a service period cannot meet a sending requirement can contend for the channel in the channel contention period as required, and remaining buffered data can be completely sent.

After the processing module 11 allocates the channel contention period to each STA, to avoid an increased collision probability, caused by video service homogeneity, of a carrier sense multiple access/collision avoidance (CSMA-CA), the access point should first set a reference user priority for each STA according to importance of the STA, and the STA then sets priorities of different types of frames in a video stream according to the reference user priority of the STA. A wireless video surveillance network has two types of channel contention periods. One is a channel contention period allocated in advance by an access point in a BI, and the other is a channel contention period obtained when other STAs whose load is relatively light release remaining service periods. To resolve the problem, Embodiment 3 of the present disclosure provides an access point. For a structure of the access point provided in this embodiment of the present disclosure, refer to the schematic structural diagram of the access point in Embodiment 1. In the access point in this embodiment, based on the access point in Embodiment 2, the processing module 11 is further configured to set a reference user priority for each STA according to importance of a video surveillance area or surveillance content of each STA.

For example, this embodiment may use four levels of user priorities, urgent, high, intermediate, and low:
urgent (level 4): urgent signaling/report, and data
high (level 3): data
intermediate (level 2): data
low (level 1): data Correspondingly, the transceiver module 12 is further configured to send the reference user priority of each STA to each STA such that each STA sets a channel contention access parameter of the channel contention period and priorities of the I frame and the P frame according to the reference user priority of each STA.

The transceiver module 12 may add the priority of each STA to a STA priority allocation element. The STA priority allocation element may be included in a beacon frame for sending. FIG. 6 is a schematic structural diagram of a STA priority allocation element. The STA priority allocation element includes an element ID, a length, a reference user priority of STA 1, a reference user priority of STA 2, . . . a reference user priority of STA N. A value of the priority field of each STA is as follows. When the value is set to 1, it indicates that the reference user priority of the STA is level 1. When the value is set to 2, it indicates that the reference user priority of the STA is level 2. When the value is set to 3, it indicates that the reference user priority of the STA is level 3. When the value is set to 4, it indicates that the reference user priority of the STA is level 4.

For the channel contention period, if each STA uses a mechanism similar to an enhanced distributed channel access (EDCA) mechanism in 802.11, the access parameter of the STA includes a minimum contention window (CWmin), a maximum contention window (CWmax), an arbitration interframe space (AIFS), and a transmission opportunity (TXOP). When the STA sets these channel contention access parameters, not only homogeneous properties of video stream services need to be considered, that is, parameter values of the STAs cannot have an excessively large difference, but also an appropriate difference needs to be left between priority parameters of different levels. This can avoid contention collision between different STAs and effectively reduce a latency of a high-priority video service. As shown in Table 3, Table 3 is a schematic diagram of channel contention access parameters of STAs having different priorities.

TABLE 3

|  | CWmin | CWmax | AIFS[i] | TXOP |
|---|---|---|---|---|
| Low (level 1) | 7 | 30 | 5 | 1.5 milliseconds |
| Intermediate (level 2) | 7 | 15 | 3 | 2 milliseconds |
| High (level 3) | 3 | 7 | 2 | 3 milliseconds |
| Urgent (level 4) | 1 | 3 | 1 | 4 milliseconds |

A method of setting a user priority by a STA belongs to an application layer. The STA may set user priorities of all local data frames according to a higher-layer instruction (n STA management entity (SME) sends a primitive including a priority configuration parameter) or by receiving an instruction (for example, a STA priority allocation element) from the access point. In this embodiment, the user priorities of the STA include a priority of an internal data frame and a priority of a data frame between STAs.

For an order to send data frames of a STA, data frames (I frames or P frames) in a same video stream are strictly sent in a first in first out manner according to the time at which the frames enter a buffer queue, because for I frames or P frames of a same STA, each I frame or P frame separately corresponds to a picture of a video, and the I frame and the P frame have the same latency QoS requirements, and should be buffered and sent in the first in first out manner according to a generation order during video coding.

The STA needs to separately buffer the I frame and the P frame in two queues. A priority of the I frame is higher than a priority of the P frame. A method of setting a priority of a data frame includes the following steps.

(1) The priority of the P frame of the STA is the same as a reference user priority of the STA, the priority of the I frame is higher than the priority of the P frame, and a priority of a retransmitted frame is higher than a priority of a non-retransmitted frame.

(2) After detecting a motion, the STA may raise priorities of all data frames by a same level.

(3) A priority of a retransmitted data frame needs to be raised. A function of the priorities on reducing an access collision probability is reflected in that data frames of different STAs have different priorities.

The processing module 11 is further configured to detect whether a motion change occurs in the video surveillance content of each STA, and if detecting that a motion change occurs in video surveillance content of any STA in the STAs, adjust an I frame service period and a P frame service period that are allocated to the STA, and adjust a reference user priority of the STA. An I frame service period of the STA after the adjustment is greater than the I frame service period before the adjustment, a P frame service period of the STA after the adjustment is greater than the P frame service period before the adjustment, and a reference user priority of the STA after the adjustment is higher than the reference user priority before the adjustment.

The transceiver module 12 is further configured to notify the STA of a result of the adjustment by the processing module 11.

A motion change of content appearing in a static picture is an important event in a video surveillance application. For example, if a human motion appears in a static picture on a surveillance terminal in video surveillance for security, or a vehicle motion appears in a static picture on a surveillance terminal in traffic surveillance, importance of the surveillance terminal increases greatly, and packet loss rate, latency, and other QoS requirements of the surveillance terminal are much higher than those of another surveillance terminal. Therefore, in this embodiment, the AP needs to detect whether the video surveillance content of each STA changes.

In this embodiment, motion detection on the video surveillance content may be performed at a STA or access pointside. When a motion is detected, the STA or the access point may further notify the other party of the motion detection result using a motion detection report element. The motion detection report element may be included in an announce frame or an information response frame. FIG. 7 is a schematic structural diagram of a motion detection report element. As shown in FIG. 7, the motion detection report element provided in this embodiment includes the following fields: an element ID, a length, motion detected, a SP prolonging request, and a STA priority. If a motion change is detected in video surveillance content of a STA, the motion field is set to 1 in order to indicate that the motion change occurs in the video surveillance content of the STA. Otherwise, it indicates that no motion change occurs in the video surveillance content of the STA. When the STA detects that a motion change occurs in the video surveillance content, the service period prolonging request field is set to 1, to indicate that the access point is requested to temporarily prolong an I frame service period and a P frame service period of the STA in a subsequent BI. When the service period prolonging request field is set to 0, it indicates that the access point is requested to resume original lengths of the I frame service period and the P frame service period. The STA priority field is used by the access point to indicate a priority level to which the STA needs to be raised in the subsequent BI. When the STA priority field is set to 0, it indicates that the STA maintains a current priority.

After the STA receives the motion detection report element sent by the access point, the STA allocates, according to a data frame priority rule between STAs, more scheduling timeslots to data of the STA in which a motion is detected, that is, increases the length of the I frame service period of the STA and the length of the P frame service period. How much the I frame service period is increased depends on how much the video surveillance content changes. The access point may obtain empirical values according to historical data of dynamic changes of surveillance rates of different STAs in order to determine a length of the I frame service period and a length of the P frame service period that are required after a motion change occurs in the video surveillance content of each STA. In addition, the access point raises a reference user priority of the STA. Correspondingly, a priority of an I frame and a priority of a P frame of the STA both are raised by a corresponding level, to ensure latency QoS of the STA preferentially.

The processing module 11 is further configured to resume the I frame service period, the P frame service period, and the reference user priority of the STA of the user after no motion change occurs in the video surveillance content of the STA. An I frame service period of the STA after the resumption is equal to the I frame service period before the adjustment, a P frame service period of the STA after the resumption is equal to the P frame service period before the adjustment, and a reference user priority of the STA after the resumption is equal to the reference user priority before the adjustment.

The transceiver module 12 is further configured to notify the STA of a result of the resumption by the processing module 11.

After the access point detects that no motion occurs in the video surveillance content of the STA, the access point should resume the length of the I frame service period and the length of the P frame service period of the STA, and resume the reference user priority of the STA, to resume priorities of all data frames of the STA to those before the raise. Because video coding rates of some STAs increase significantly due to motion changes of video surveillance content of these STAs, resulting in time resources being insufficient, the access point should set video coding quantization parameters (QPs) of STAs in order to decrease encoding rates or frame rates of some STAs having relatively low priorities, or set an encoding manner to a CBR encoding manner having a relatively low rate.

In the access point in this embodiment, the processing module sets a reference user priority for each STA such that each STA sets an access parameter of each STA according to the reference user priority of each STA, and contends in a channel contention period according to the access parameter. Because users having different priorities have different access parameters, a collision probability when STAs contend in the channel contention period can be reduced. In addition, in this embodiment, the processing module further detects whether a motion change occurs in the video surveillance content of each STA, and when a motion change occurs in the video surveillance content of a STA, correspondingly, an I frame service period and a P frame service period of the STA are prolonged, and a priority of the STA is raised, thereby ensuring latency QoS of the STA preferentially.

In this embodiment, when the access point sends the I frame or a P frame, an application layer of the access point adds a frame type parameter to the I frame and the P frame transferred to a MAC layer such that the MAC layer of the access point determines, according to the frame type parameter, whether a received data frame is the I frame or the P frame.

FIG. 8 is a schematic structural diagram of a STA according to Embodiment 4 of the present disclosure. As shown in FIG. 8, the STA provided in this embodiment includes a receiving module 21 and a sending module 22.

The receiving module 21 is configured to receive an initial sending time and a sending period of an I frame that are sent by an access point.

The receiving module 21 is further configured to receive a first I frame interval setting request sent by the access point, where the first I frame interval setting request includes the initial sending time of the STA, and receive a second I frame interval setting request sent by the access point, where the second I frame interval setting request includes the I frame sending period of the STA.

The receiving module 21 is further configured to receive a result, sent by the access point, of allocating an I frame service period and a P frame service period. The I frame service period and the P frame service period are allocated by the access point to the STA in each beacon interval according to the initial sending time and the sending period of the I frame of the STA.

The sending module 22 is configured to send the I frame in the I frame service period and send the P frame in the P frame service period according to the initial sending time of the I frame and the I frame sending period.

In the STA in this embodiment, according to an initial sending time and a sending period of an I frame that are allocated by an access point, a sending module sends the I frame in an I frame service period allocated by the access point and sends a P frame in a P frame service period allocated by the access point. During allocation, the access point staggers the initial sending times of STAs such that network load balance is achieved, and it is ensured that a latency of each STA meets a QoS requirement.

FIG. 9 is a schematic structural diagram of a STA according to Embodiment 5 of the present disclosure. As shown in FIG. 9, in the STA in this embodiment, based on the STA in Embodiment 4, each beacon interval further includes a channel contention period allocated by the access point. When the STA fails to completely send all buffered data in the I frame service period and the P frame service period, the STA uses the channel contention period to send data. The channel contention period is shared by all STAs associated with the access point.

Correspondingly, the receiving module 21 is further configured to receive contention period control signaling sent by the access point. The contention period control signaling is used to forbid the STA to access a channel in a channel contention period before the first service period in each beacon interval, and the first service period of the STA is the I frame service period or the P frame service period.

The STA further includes a setting module 23. The receiving module 21 is further configured to receive a reference user priority sent by the access point. The setting module 23 is configured to set a channel contention access parameter of the channel contention period according to the reference user priority, and contend for the channel in the contention period according to the channel contention access parameter. The setting module 23 is further configured to set a priority of the I frame and a priority of the P frame according to the reference user priority. The priority of the P frame is the same as the reference user priority, the priority of the I frame is higher than the priority of the P frame, and a priority of a retransmitted frame of the STA is higher than a priority of a non-retransmitted frame. In this embodiment, for a specific implementation manner of setting the channel contention access parameter of the channel contention period by the setting module 23 according to the reference user priority, refer to a related description in Embodiment 3. Details are not described again herein.

The receiving module 21 is further configured to receive a result of adjustment that is sent by the access point. The result of the adjustment is sent by the access point after the access point detects a motion change of the video surveillance content of the STA. The result of the adjustment includes: an I frame service period of the STA after the adjustment, a P frame service period of the STA after the adjustment, and a reference user priority of the STA after the adjustment. The I frame service period of the STA after the adjustment is greater than the I frame service period before the adjustment, the P frame service period of the STA after the adjustment is greater than the P frame service period before the adjustment, and the reference user priority of the STA after the adjustment is higher than the reference user priority before the adjustment.

The receiving module 21 is further configured to receive a result of resumption that is sent by the access point. The result of the resumption is sent by the access point after the access point detects that no motion change occurs in the video surveillance content of the STA. The result of resumption includes an I frame service period of the STA after the resumption, a P frame service period of the STA after the resumption, and a reference user priority of the STA after the resumption. The I frame service period of the STA after the resumption is equal to the I frame service period before the adjustment, the P frame service period of the STA after the resumption is equal to the P frame service period before the adjustment, and the reference user priority of the STA after the resumption is equal to the reference user priority before the adjustment.

Optionally, in this embodiment, the I frame service period allocated by the access point to the STA is greater than the P frame service period.

In this embodiment, when the STA sends the I frame or the P frame, an application layer of the STA adds a frame type parameter to the I frame and the P frame transferred to a MAC layer such that the MAC layer of the STA determines, according to the frame type parameter, whether a received data frame is the I frame or the P frame.

In the STA in this embodiment, a setting module sets an access parameter of a channel contention period according to a reference user priority of the STA for contending in the channel contention period according to the access parameter. Because users having different priorities have different access parameters, a collision probability when STAs contend in the channel contention period can be reduced. In addition, in this embodiment, an access point further detects whether a motion change occurs in the video surveillance content of the STA. When a motion change occurs in the video surveillance content of the STA, correspondingly, an I frame service period and a P frame service period of the STA are prolonged, and the priority of the STA is raised, thereby ensuring latency QoS of the STA preferentially.

It should be noted that, in the embodiments of the present disclosure, parameter exchange between a MAC layer management entity (MLME) and a video encoder of a STA is implemented using a packet-accompanying management parameter transferred by an MLME service access point (MLME_SAP), because an initial sending time and a sending period of an I frame is input parameters of the video encoder of a STA, and the MLME of the STA does not have a right to set the parameters. However, after a MAC layer of the STA receives an I frame interval setting request frame, the MLME may transfer, to a STA management entity (SME) SME using the MLME_SAP, an initial sending time and a sending period of an I frame that are carried in the frame such that the SME sets or adjusts the input parameters of the video encoder.

To enable the MAC layer of the STA to distinguish the I frame and a P frame, the STA needs to set the following packet-accompanying parameter set in an MSDU transferred by a higher layer to the MAC layer.

A packet-accompanying primitive parameter set between the MAC layer and the SME or a higher-layer application program, TXLIST and RXLIST. TXLIST includes a frame type (FRAME_TYPE), latency QoS (Latency_QoS), and a set GOP value (GOP_SET). RXLIST includes motion detected (Motion_Detected) and a requested GOP value (GOP_Requested). By means of a primitive carrying a frame type parameter, when the access point and the STA send data frames, an I frame and a P frame in a same video service stream can be distinguished, and MAC layers of the access point and the STA may separately set respective buffer queues for the I frame and the P frame, and apply different channel contention access parameters to different buffer queues. Another control parameter in the packet-accompanying primitive parameter set may implement control parameter exchange between the MAC layer and the encoder or the higher layer in the access point and the STA.

FIG. 10 is a flowchart of a multi-video stream transmission method according to Embodiment 6 of the present disclosure. As shown in FIG. 10, the method in this embodiment may include the following steps.

Step 101: An access point allocates initial sending time and sending periods of I frames to at least two STAs associated with the access point, where an interval between initial sending time of I frames of any two STAs whose I frame sending time is adjacent of the at least two STAs is not equal to a difference between I frame sending periods of the any two adjacent STAs, and the interval between the initial sending time of the I frames of the any two adjacent STAs is greater than 0.

Optionally, the interval between the initial sending time of the I frames of the any two adjacent STAs is the same.

Optionally, the interval between the initial sending time of the I frames of the any two adjacent STAs is:

$$C_I = \frac{1}{\sum_i \frac{1}{N_{GOP}(i)}} \times \frac{1}{F},$$

where $N_{GOP}(i)$ is a length of a GOPs of an $i^{th}$ STA, $i=1, \ldots K$, K is a total quantity of STAs, and F is a frame rate of each STA.

Step 102: The access point sends an initial sending time and a sending period of an I frame to each STA of the at least two STAs.

Further, first, the access point sends a first I frame interval setting request to each STA. The first I frame interval setting request includes the initial sending time of each STA such that each STA sets its initial I frame sending time according to the initial sending time of each STA.

Then, the access point receives a first I frame interval setting response returned by each STA. The first I frame interval setting response includes an adjustment result of its initial I frame sending time.

Finally, if the adjustment result of its initial I frame sending time indicates that each STA sets its initial I frame sending time according to the initial sending time included in the first I frame interval setting request, the access point sends a second I frame interval setting request to each STA. The second I frame interval setting request includes the I frame sending period of each STA such that each STA adjusts the I frame sending period of each STA to the sending period included in the second I frame interval setting request.

Step 103: The access point allocates an I frame service period and a P frame service period to each STA according to the initial sending time and the sending period of the I frame of each STA, where each STA exclusively occupies a channel in the I frame service period and the P frame service period.

An interval T between I frame service periods of the any two adjacent STAs meets the following condition $T_{min} \leq T \leq T_{max}$, where $T_{min}$ and $T_{max}$ are determined by the access point according to the initial sending time and the sending period of the I frame of each STA.

Optionally, $T_{min}$ and $T_{max}$ are calculated using the following formulas:

$$T_{min} = \min\{|(|N_{GOP}(1) - N_{GOP}(2)|/F - |T_1 - T_2|)|, |T_1 - T_2|\}$$

and $$T_{max} = \max\{|(|N_{GOP}(1) - N_{GOP}(2)|/F - |T_1 - T_2|)|, |T_1 - T_2|\},$$

where $N_{GOP}(1)$ and $N_{GOP}(2)$ are lengths of GOPs of the any two adjacent STAs, F is a frame rate of the any two adjacent STAs, and $T_1$ and $T_2$ are the initial sending time of the I frames of the any two adjacent STAs.

Step 104: The access point sends, to each STA, a result of allocating the I frame service period and the P frame service period to each STA.

After the access point allocates the I frame service period and the P frame service period to each STA, the access point notifies each STA of a result of the allocation. Each STA sends the I frame in the I frame service period allocated to each STA and sends the P frame in the P frame service period allocated to each STA, and does not need to perform channel contention.

In this embodiment, an access point sets an initial sending time and a sending period of an I frame of each STA associated with the access point such that an interval between initial sending time of I frames of any two STAs whose I frame sending time is adjacent is not equal to a difference between I frame sending periods of the any two adjacent STAs, and allocates an I frame service period and a P frame service period to each STA according to the initial sending time and the sending period of the I frame of each STA. Each STA exclusively occupies a channel in the I frame service period and the P frame service period such that the I frame sending times of STAs are staggered, network load balance is achieved, and it is ensured that a latency of each STA meets a QoS requirement.

The method in this embodiment may be executed by the access point in Embodiment 1. Specific implementation manners and principles thereof are the same. Refer to a related description in Embodiment 1 for details, which are not described again herein.

Figure 11:
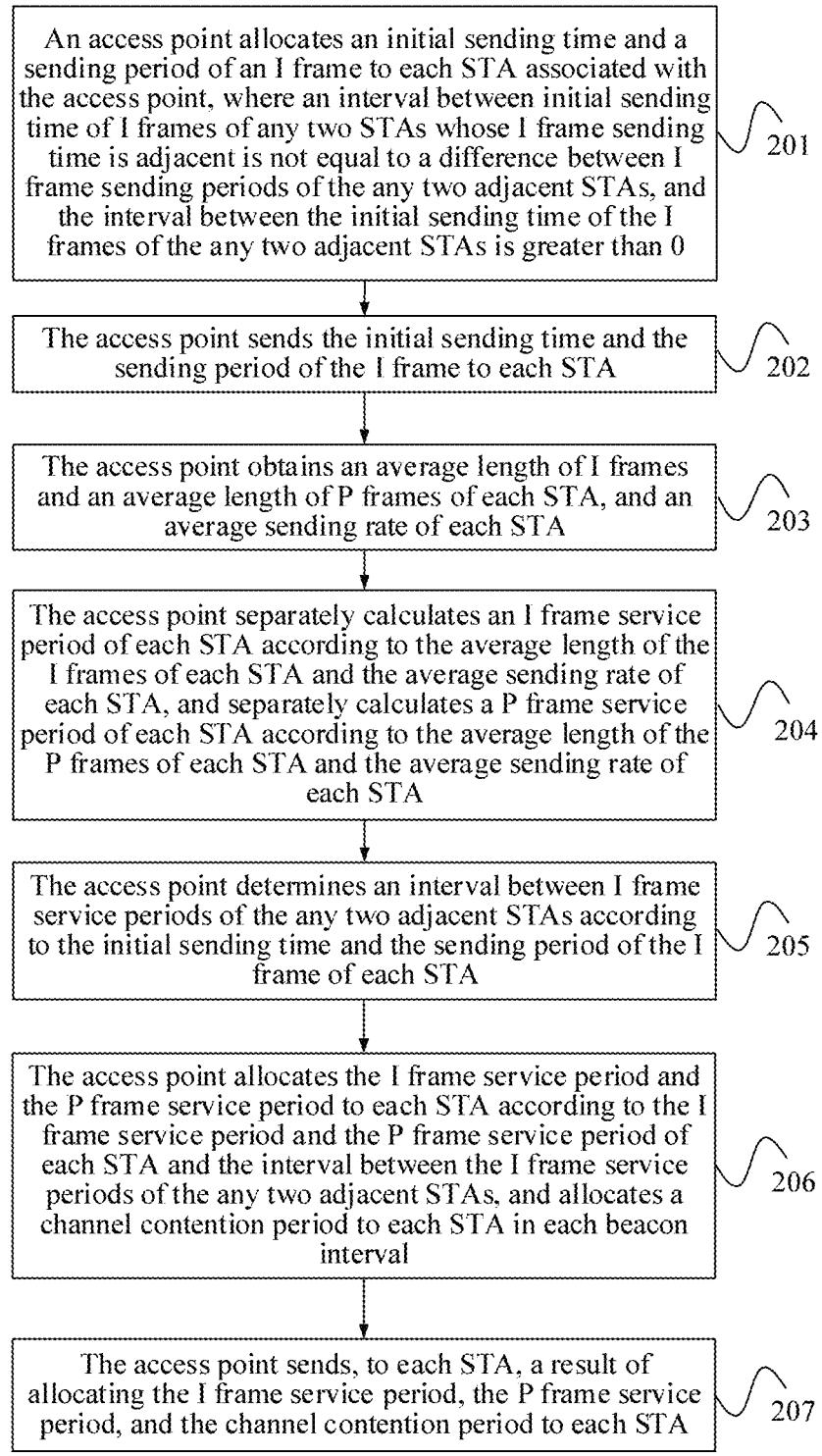
FIG. 11 is a flowchart of a multi-video stream transmission method according to Embodiment 7 of the present disclosure.

FIG. 11 is a flowchart of a multi-video stream transmission method according to Embodiment 7 of the present disclosure. In this embodiment, how an access point allocates I frame and P frame service periods to each STA is described in detail. As shown in FIG. 11, the method in this embodiment may include the following steps.

Step 201: An access point allocates an initial sending time and a sending period of an I frame to each STA associated with the access point, where an interval between initial sending time of I frames of any two STAs whose I frame sending time is adjacent is not equal to a difference between I frame sending periods of the any two adjacent STAs, and the interval between the initial sending time of the I frames of the any two adjacent STAs is greater than 0.

Step 202: The access point sends the initial sending time and the sending period of the I frame to each STA.

Step 203: The access point obtains an average length of I frames and an average length of P frames of each STA, and an average sending rate of each STA.

Step 204: The access point separately calculates an I frame service period of each STA according to the average length of the I frames of each STA and the average sending rate of each STA, and separately calculates a P frame service period of each STA according to the average length of the P frames of each STA and the average sending rate of each STA.

Step 205: The access point determines an interval between I frame service periods of the any two adjacent STAs according to the initial sending time and the sending period of the I frame of each STA.

Step 206: The access point allocates the I frame service period and the P frame service period to each STA according to the I frame service period and the P frame service period of each STA and the interval between the I frame service periods of the any two adjacent STAs, and allocates a channel contention period to each STA in each beacon interval.

Step 207: The access point sends, to each STA, a result of allocating the I frame service period, the P frame service period, and the channel contention period to each STA.

In this embodiment, the I frame service period allocated by the access point to each STA is greater than the P frame service period allocated to each STA, and the channel contention period is reserved. The channel contention period is used by each STA to send data when each STA fails to completely send all buffered data in the I frame service period and the P frame service period of each STA, and the channel contention period is shared by each STA. Optionally, the channel contention period may be allocated in advance by the access point in the BI, or may be a time after some STAs whose load is relatively light release remaining I frame service periods and/or P frame service periods.

Optionally, when the access point allocates the channel contention period in the BI, the AP further sends contention period control signaling to each STA. The contention period control signaling forbids some STAs or all STAs in the STAs to access a channel in a channel contention period before the first service periods in respective BIs, and the first service period of each STA is the I frame service period or the P frame service period. As the contention period control signaling is sent, a collision caused because a large quantity of STAs send data in a same channel contention period can be avoided.

In this embodiment, an access point sets an initial sending time and a sending period of an I frame of each STA associated with the access point, and allocates an I frame service period, a P frame service period, and a channel contention period to each STA in a BI according to the initial sending time and the sending period of the I frame of each STA. Each STA exclusively occupies a channel in the I frame service period and the P frame service period, and each STA contends for the channel in the channel contention period such that I frame sending time of STAs are staggered, network load balance is achieved, it is ensured that network peak load does not exceed a network load tolerance, and it is ensured that a latency of each STA meets a QoS requirement. In addition, as the channel contention period is allocated to the STA in the BI, each STA whose length of an service period cannot meet a sending requirement can contend for the channel in the channel contention period as required, and remaining buffered data can be completely sent.

The method in this embodiment may be executed by the access point in Embodiment 2. Specific implementation manners and technical effects thereof are similar. Refer to a description in Embodiment 2 for details, which are not described again herein.

Based on Embodiment 1 and Embodiment 2, Embodiment 7 may further include the following step. When the access point detects that the interval between the initial sending time of the I frames of the any two adjacent STAs is equal to the difference between the I frame sending periods of the any two adjacent STAs, the access point requests, by sending an I frame interval request frame, at least one STA of the any two adjacent STAs to adjust an I frame sending period of the STA such that after the adjustment, the interval between the initial sending time of the I frames of the any two adjacent STAs is not equal to a difference between I frame sending periods of the any two adjacent STAs, or when the access point detects that a minimum value of the interval between the I frame service periods of the any two adjacent STAs $\min\{|(|N_{GOP}(1)-N_{GOP}(2)|/F-|T_1-T_2|)|, |T_1-T_2|\}$ is less than a preset interval threshold, the access point requests, by sending an I frame interval request frame, at least one STA of the any two adjacent STAs to adjust an I frame sending period of the STA such that after the adjustment, a minimum value of an interval between I frame service periods of the any two adjacent STAs is not less than the interval threshold.

Figure 12:
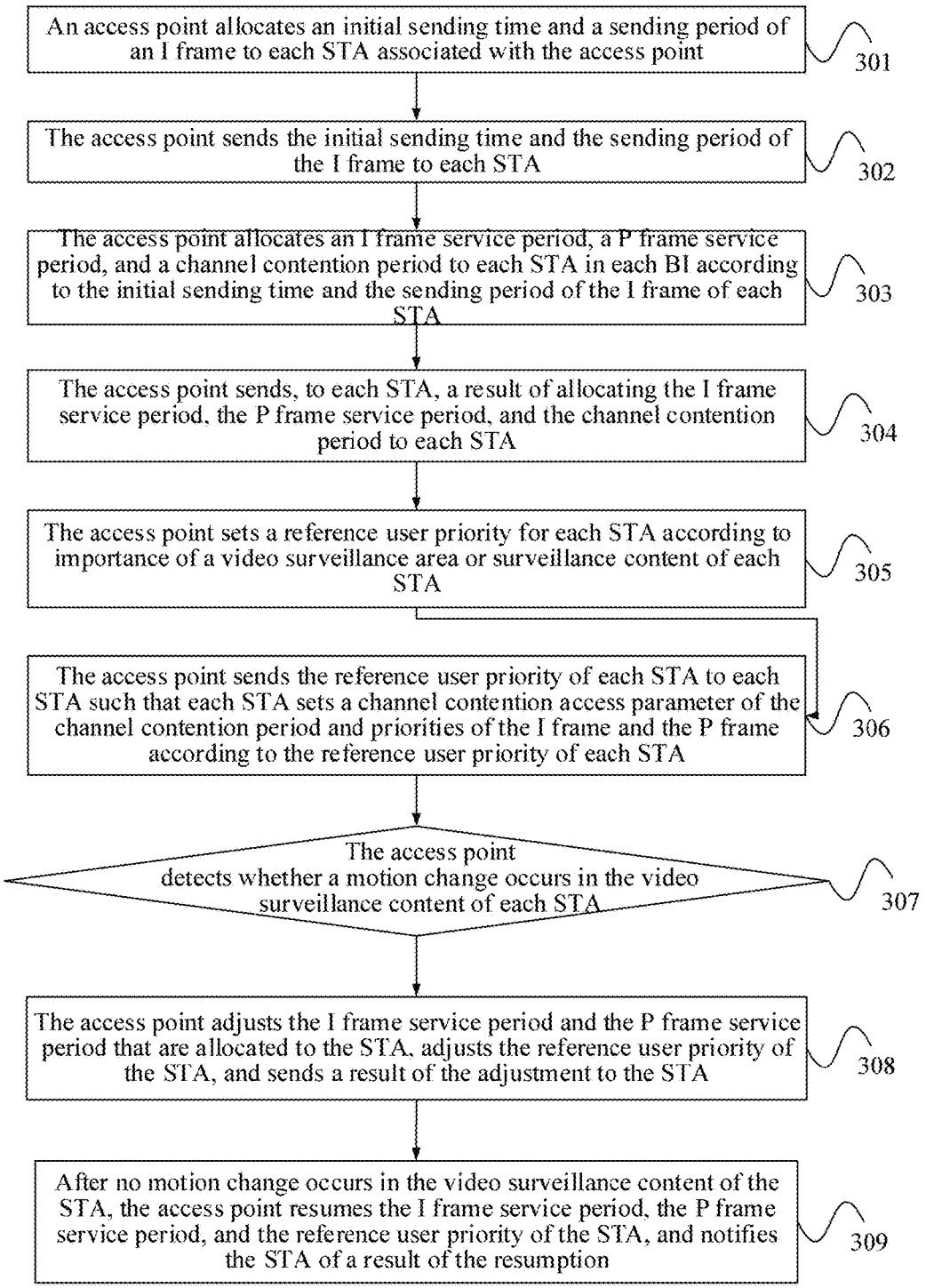
FIG. 12 is a flowchart of a multi-video stream transmission method according to Embodiment 8 of the present disclosure.

FIG. 12 is a flowchart of a multi-video stream transmission method according to Embodiment 8 of the present disclosure. As shown in FIG. 12, the method provided in this embodiment may include the following steps.

Step 301: An access point allocates an initial sending time and a sending period of an I frame to each STA associated with the access point.

An interval between initial sending time of I frames of any two STAs whose I frame sending time is adjacent is not equal to a difference between I frame sending periods of the any two adjacent STAs, and the interval between the initial sending time of the I frames of the any two adjacent STAs is greater than 0.

Step 302: The access point sends the initial sending time and the sending period of the I frame to each STA.

Step 303: The access point allocates an I frame service period, a P frame service period, and a channel contention period to each STA in each BI according to the initial sending time and the sending period of the I frame of each STA.

Step 304: The access point sends, to each STA, a result of allocating the I frame service period, the P frame service period, and the channel contention period to each STA.

For specific implementation manners of step 301 and step 302, refer to a related description in Embodiment 1. Details are not described again herein. For specific implementation manners of step 303 and step 304, refer to a related description in Embodiment 2. Details are not described again herein.

Step 305: The access point sets a reference user priority for each STA according to importance of a video surveillance area or surveillance content of each STA.

Step 306: The access point sends the reference user priority of each STA to each STA such that each STA sets a channel contention access parameter of the channel contention period and priorities of the I frame and the P frame according to the reference user priority of each STA.

Step 307: The access point detects whether a motion change occurs in the video surveillance content of each STA.

If yes, that is, the access point detects that a motion change occurs in video surveillance content of any STA in the STAs, perform step 308. If not, that is, no motion change occurs in the video surveillance content of each STA, go back to continue to perform step 307.

Step 308: The access point adjusts the I frame service period and the P frame service period that are allocated to the STA, adjusts the reference user priority of the STA, and sends a result of the adjustment to the STA.

An I frame service period of the STA after the adjustment by the access point is greater than the I frame service period before the adjustment, a P frame service period of the STA after the adjustment by the access point is greater than the P frame service period before the adjustment, and a reference user priority of the STA after the adjustment is higher than the reference user priority before the adjustment.

Step 309: After no motion change occurs in the video surveillance content of the STA, the access point resumes the I frame service period, the P frame service period, and the reference user priority of the STA, and notifies the STA of a result of the resumption.

An I frame service period of the STA after the resumption is equal to the I frame service period before the adjustment, a P frame service period of the STA after the resumption is equal to the P frame service period before the adjustment, and a reference user priority of the STA after the resumption is equal to the reference user priority before the adjustment.

In the method in this embodiment, an access point sets a reference user priority for each STA such that each STA sets an access parameter of each STA according to the reference user priority of each STA, and contends in a channel contention period according to the access parameter. Because users having different priorities have different access parameters, a collision probability when STAs contend in the channel contention period can be reduced. In addition, in this embodiment, the access point further detects whether a motion change occurs in the video surveillance content of each STA, and when a motion change occurs in the video surveillance content of a STA, correspondingly, an I frame service period and a P frame service period of the STA are prolonged, and a priority of the STA is raised, thereby ensuring latency QoS of the STA preferentially.

The method in this embodiment may be executed by the access point in Embodiment 3. Specific implementation manners and technical effects thereof are similar. Refer to Embodiment 3 for details, which are not described again herein.

Figure 13:
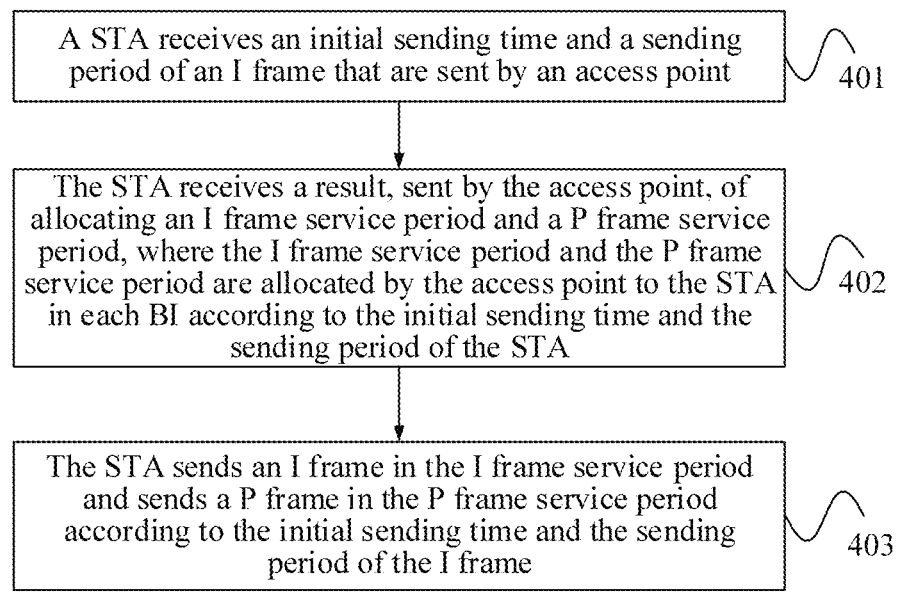
FIG. 13 is a flowchart of a multi-video stream transmission method according to Embodiment 9 of the present disclosure.

FIG. 13 is a flowchart of a multi-video stream transmission method according to Embodiment 9 of the present disclosure. In this embodiment, the multi-video stream transmission method is described from a STA perspective. As shown in FIG. 13, the method in this embodiment may include the following steps.

Step 401: A STA receives an initial sending time and a sending period of an I frame that are sent by an access point.

After the access point allocates an initial sending time and a sending period to each STA associated with the access point, the access point sends a result of the allocation to each STA. Further, the STA receives a first I frame interval setting request sent by the access point. The first I frame interval setting request includes the initial sending time of the STA. The STA receives a second I frame interval setting request sent by the access point. The second I frame interval setting request includes the I frame sending period of the STA.

Step 402: The STA receives a result, sent by the access point, of allocating an I frame service period and a P frame service period, where the I frame service period and the P frame service period are allocated by the access point to the STA in each BI according to the initial sending time and the sending period of the STA.

Step 403: The STA sends an I frame in the I frame service period and sends a P frame in the P frame service period according to the initial sending time and the sending period of the I frame.

The STA exclusively occupies a channel in the I frame service period and the P frame service period, and does not need to perform channel contention.

In this embodiment, according to an initial sending time and a sending period of an I frame that are allocated by an access point, a STA sends the I frame in an I frame service period allocated by the access point and sends a P frame in a P frame service period allocated by the access point. During allocation, the access point staggers initial sending time of STAs such that network load balance is achieved, and it is ensured that a latency of each STA meets a QoS requirement.

The method in this embodiment may be executed by the STA in Embodiment 4. Specific implementation manners and technical effects thereof are similar. Refer to a description in Embodiment 4 for details, which are not described again herein.

Figure 14:
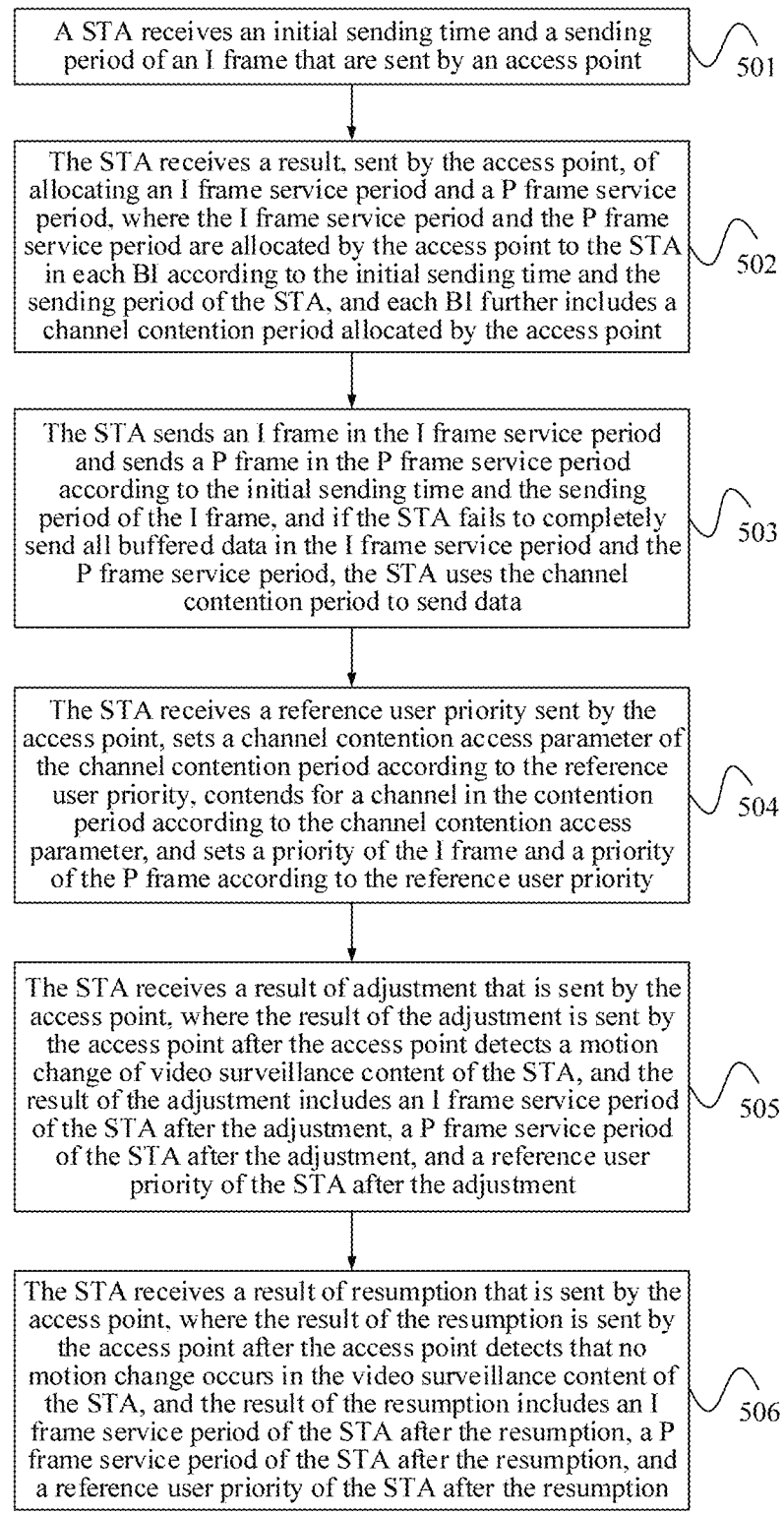
FIG. 14 is a flowchart of a multi-video stream transmission method according to Embodiment 10 of the present disclosure.

FIG. 14 is a flowchart of a multi-video stream transmission method according to Embodiment 10 of the present disclosure. As shown in FIG. 14, the method provided in this embodiment may include the following steps.

Step 501: A STA receives an initial sending time and a sending period of an I frame that are sent by an access point.

Step 502: The STA receives a result, sent by the access point, of allocating an I frame service period and a P frame service period, where the I frame service period and the P frame service period are allocated by the access point to the STA in each BI according to the initial sending time and the sending period of the STA, and each BI further includes a channel contention period allocated by the access point.

In this embodiment, the access point further allocates in each BI a channel contention period to the STA associated with the access point. When the STA fails to completely send all buffered data in the I frame service period and the P frame service period, the STA uses the channel contention period to send data. The channel contention period is shared by all STAs associated with the access point.

Step 503: The STA sends the I frame in the I frame service period and sends the P frame in the P frame service period according to the initial sending time and the sending period of the I frame, and if the STA fails to completely send all buffered data in the I frame service period and the P frame service period, the STA uses the channel contention period to send data.

Optionally, the STA receives contention period control signaling sent by the access point. The contention period control signaling forbids the STA to access a channel in a channel contention period before the first service period in each BI. The first service period of the STA is the I frame service period or the P frame service period.

Step 504: The STA receives a reference user priority sent by the access point, sets a channel contention access parameter of the channel contention period according to the reference user priority, contends for a channel in the contention period according to the channel contention access parameter, and sets a priority of the I frame and a priority of the P frame according to the reference user priority.

The priority of the P frame is the same as the reference user priority, the priority of the I frame is higher than the priority of the P frame, and a priority of a retransmitted frame of the STA is higher than a priority of a non-retransmitted frame.

Step 505: The STA receives a result of adjustment that is sent by the access point, where the result of the adjustment is sent by the access point after the access point detects a motion change of video surveillance content of the STA, and the result of the adjustment includes an I frame service period of the STA after the adjustment, a P frame service period of the STA after the adjustment, and a reference user priority of the STA after the adjustment.

The I frame service period of the STA after the adjustment is greater than the I frame service period before the adjustment, the P frame service period of the STA after the adjustment is greater than the P frame service period before the adjustment, and the reference user priority of the STA after the adjustment is higher than the reference user priority before the adjustment.

Step 506: The STA receives a result of resumption that is sent by the access point, where the result of the resumption is sent by the access point after the access point detects that no motion change occurs in the video surveillance content of the STA, and the result of the resumption includes an I frame service period of the STA after the resumption, a P frame service period of the STA after the resumption, and a reference user priority of the STA after the resumption.

The I frame service period of the STA after the resumption is equal to the I frame service period before the adjustment, the P frame service period of the STA after the resumption is equal to the P frame service period before the adjustment, and the reference user priority of the STA after the resumption is equal to the reference user priority before the adjustment.

In the method in this embodiment, an access point sets a reference user priority for each STA such that each STA sets an access parameter of each STA according to the reference user priority of each STA, and contends in a channel contention period according to the access parameter. Because users having different priorities have different access parameters, a collision probability when STAs contend in the channel contention period can be reduced. In addition, in this embodiment, the access point further detects whether a motion change occurs in the video surveillance content of the STA. When a motion change occurs in the video surveillance content of the STA, correspondingly, an I frame service period and a P frame service period of the STA are prolonged, and the priority of the STA is raised, thereby ensuring latency QoS of the STA preferentially.

The method in this embodiment may be executed by the STA in Embodiment 5. Specific implementation manners and technical effects thereof are similar. Refer to a description in Embodiment 5 for details, which are not described again herein.

Figure 15:
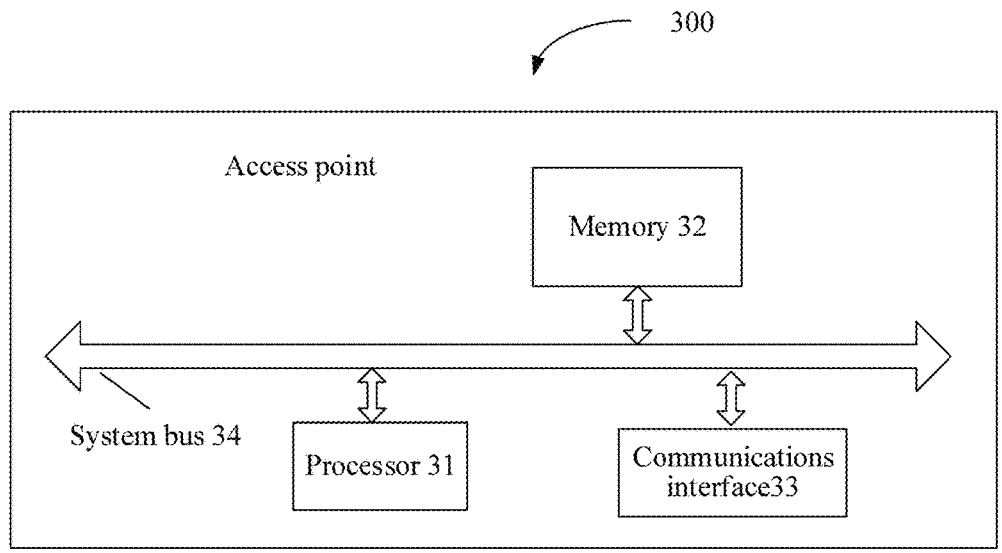
FIG. 15 is a schematic structural diagram of an access point according to Embodiment 11 of the present disclosure.

FIG. 15 is a schematic structural diagram of an access point according to Embodiment 11 of the present disclosure. As shown in FIG. 15, the access point 300 provided in this embodiment of the present disclosure includes a processor 31, a memory 32, a communications interface 33, and a system bus 34. The memory 32 and the communications interface 33 are connected to the processor 31 using the system bus 34 for mutual communication. The memory 32 is configured to store a computer execution instruction. The communications interface 33 is configured to communicate with another device. The processor 31 is configured to run the computer execution instruction such that the access point 300 executes the following method allocating initial sending time and sending periods of I frames to at least two STAs associated with the access point, where an interval between initial sending time of I frames of any two STAs whose I frame sending time is adjacent of the at least two STAs is not equal to a difference between I frame sending periods of the any two adjacent STAs, and the interval between the initial sending time of the I frames of the any two adjacent STAs is greater than 0, sending an initial sending time and a sending period of an I frame to each STA of the at least two STAs, allocating an I frame service period and a P frame service period to each STA according to the initial sending time and the sending period of the I frame of each STA, where each STA exclusively occupies a channel in the I frame service period and the P frame service period, and an interval T between I frame service periods of the any two adjacent STAs meets the following condition $T_{min} \leq T \leq T_{max}$, where $T_{min}$ and $T_{max}$ are determined by the access point according to the initial sending time and the sending period of the I frame of each STA, and sending, to each STA, a result of allocating the I frame service period and the P frame service period to each STA.

Optionally, $T_{min}$ and $T_{max}$ are calculated using the following formulas:

$$T_{min} = \min\{|(|N_{GOP}(1) - N_{GOP}(2)|/F - |T_1 - T_2|)|, |T_1 - T_2|\}$$
and $$T_{max} = \max\{|(|N_{GOP}(1) - N_{GOP}(2)|/F - |T_1 - T_2|)|, |T_1 - T_2|\},$$

where $N_{GOP}(1)$ and $N_{GOP}(2)$ are lengths of GOPs of the any two adjacent STAs, F is a frame rate of the any two adjacent STAs, and $T_1$ and $T_2$ are the initial sending time of the I frames of the any two adjacent STAs.

Optionally, the interval between the initial sending time of the I frames of the any two adjacent STAs is the same.

Optionally, the interval between the initial sending time of the I frames of the any two adjacent STAs is:

$$C_I = \frac{1}{\sum_i \frac{1}{N_{GOP}(i)}} \times \frac{1}{F},$$

where $N_{GOP}(i)$ is a length of a GOPs of an $i^{th}$ STA, i=1, . . . K, K is a total quantity of STAs, and F is a frame rate of each STA.

The processor 31 is further configured to request, when detecting that the interval between the initial sending time of the I frames of the any two adjacent STAs is equal to the difference between the I frame sending periods of the any two adjacent STAs, by sending an I frame interval request frame, at least one STA of the any two adjacent STAs to adjust an I frame sending period of the STA such that after the adjustment, the interval between the initial sending time of the I frames of the any two adjacent STAs is not equal to a difference between I frame sending periods of the any two adjacent STAs, or request, when detecting that a minimum value of the interval between the I frame service periods of the any two adjacent STAs $\min\{|(|N_{GOP}(1) - N_{GOP}(2)|/F - |T_1 - T_2|)|, |T_1 - T_2|\}$ is less than a preset interval threshold, by sending an I frame interval request frame, at least one STA of the any two adjacent STAs to adjust an I frame sending period of the STA such that after the adjustment, a minimum value of an interval between I frame service periods of the any two adjacent STAs is not less than the interval threshold.

Sending, by the processor 31, an initial sending time and a sending period of an I frame to each STA includes separately sending a first I frame interval setting request to each STA, where the first I frame interval setting request includes the initial sending time of each STA such that each STA sets its initial I frame sending time according to the initial sending time of each STA, receiving a first I frame interval setting response returned by each STA, where the first I frame interval setting response includes an adjustment result of its initial I frame sending time, and sending a second I frame interval setting request to each STA if the adjustment result of its initial I frame sending time indicates that each STA sets its initial I frame sending time according to the initial sending time included in the first I frame interval setting request, where the second I frame interval setting request includes the I frame sending period of each STA such that each STA adjusts the I frame sending period of each STA to the sending period included in the second I frame interval setting request.

Allocating, by the processor 31, an I frame service period and a P frame service period to each STA according to the initial sending time and the sending period of the I frame of each STA includes obtaining an average length of I frames and an average length of P frames of each STA, and an average sending rate of each STA, separately calculating the I frame service period of each STA according to the average length of the I frames of each STA and the average sending rate of each STA, and separately calculating the P frame service period of each STA according to the average length of the P frames of each STA and the average sending rate of each STA, determining the interval between the I frame service periods of the any two adjacent STAs according to the initial sending time and the sending period of the I frame of each STA, and allocating the I frame service period and the P frame service period to each STA according to the I frame service period and the P frame service period of each STA and the interval between the I frame service periods of the any two adjacent STAs.

The processor 31 is further configured to allocate a channel contention period to each STA in each beacon interval. The channel contention period is used by each STA to send data when each STA fails to completely send all buffered data in the I frame service period and the P frame service period of each STA, and the channel contention period is shared by each STA.

Optionally, the processor 31 is further configured to send contention period control signaling to each STA. The contention period control signaling is used to forbid some or all of the STAs to access the channel in a channel contention period before the first service periods in respective beacon intervals. The first service period of each STA is the I frame service period or the P frame service period.

Optionally, the I frame service period allocated by the access point to each STA is greater than the P frame service period allocated to each STA.

The processor 31 is further configured to set a reference user priority for each STA according to importance of a video surveillance area or surveillance content of each STA, and send the reference user priority of each STA to each STA such that each STA sets a channel contention access parameter of the channel contention period and priorities of the I frame and the P frame according to the reference user priority of each STA.

The processor 31 is further configured to detect whether a motion change occurs in the video surveillance content of each STA, and adjust an I frame service period and a P frame service period that are allocated to the STA, adjust a reference user priority of the STA, and notify the STA of a result of the adjustment if detecting that a motion change occurs in the video surveillance content of any STA in the STAs. An I frame service period of the STA after the adjustment is greater than the I frame service period before the adjustment, a P frame service period of the STA after the adjustment is greater than the P frame service period before the adjustment, and a reference user priority of the STA after the adjustment is higher than the reference user priority before the adjustment.

The processor 31 is further configured to resume the I frame service period, the P frame service period, and the reference user priority of the STA of the user, and notify the STA of a result of the resumption after no motion change occurs in the video surveillance content of the STA. An I frame service period of the STA after the resumption is equal to the I frame service period before the adjustment, a P frame service period of the STA after the resumption is equal to the P frame service period before the adjustment, and a reference user priority of the STA after the resumption is equal to the reference user priority before the adjustment.

In this embodiment, when the access point 300 sends the I frame or a P frame, an application layer of the access point adds a frame type parameter to the I frame and the P frame transferred to a MAC layer such that the MAC layer of the access point determines, according to the frame type parameter, whether a received data frame is the I frame or the P frame.

The access point in this embodiment may be configured to execute the methods in Embodiment 6 to Embodiment 8. Specific implementation manners and technical effects thereof are similar. Details are not described again herein.

Figure 16:
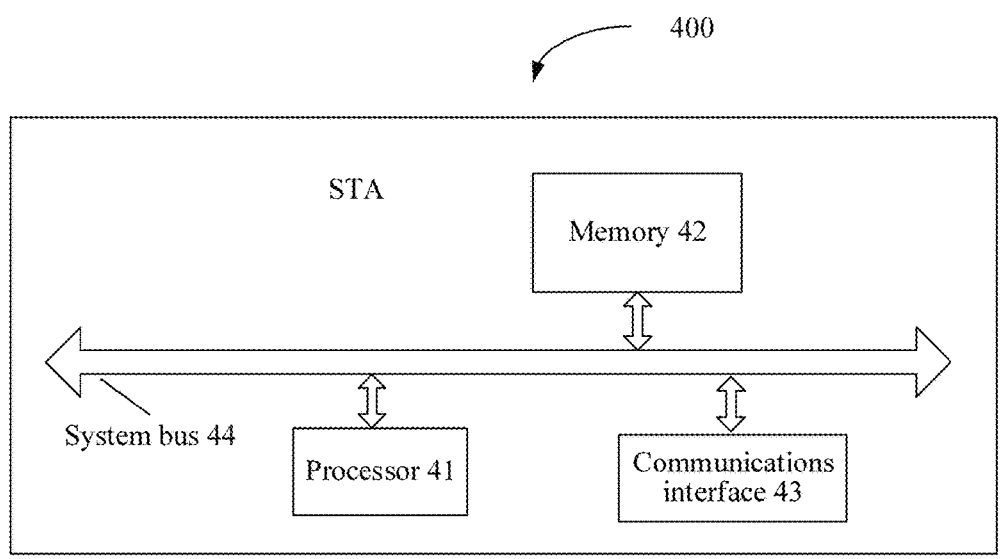
FIG. 16 is a schematic structural diagram of a STA according to Embodiment 12 of the present disclosure.

FIG. 16 is a schematic structural diagram of a STA according to Embodiment 12 of the present disclosure. As shown in FIG. 16, the STA 400 provided in this embodiment of the present disclosure includes a processor 41, a memory 42, a communications interface 43, and a system bus 44. The memory 42 and the communications interface 43 are connected to the processor 41 using the system bus 44 for mutual communication. The memory 42 is configured to store a computer execution instruction. The communications interface 43 is configured to communicate with another device. The processor 41 is configured to run the computer execution instruction such that the STA 400 executes the following method receiving an initial sending time and a sending period of an I frame that are sent by an access point, receiving a result, sent by the access point, of allocating an I frame service period and a P frame service period, where the I frame service period and the P frame service period are allocated by the access point to the STA in each beacon interval according to the initial sending time and the sending period of the I frame of the STA, and sending the I frame in the I frame service period and sending the P frame in the P frame service period according to the initial sending time of the I frame and the I frame sending period.

Receiving, by the processor 41, an initial sending time and a sending period of an I frame that are sent by an access point includes receiving a first I frame interval setting request sent by the access point, where the first I frame interval setting request includes the initial sending time of the STA 400, and receiving a second I frame interval setting request sent by the access point, where the second I frame interval setting request includes the I frame sending period of the STA 400.

Optionally, each beacon interval further includes a channel contention period allocated by the access point. When the STA 400 fails to completely send all buffered data in the I frame service period and the P frame service period, the STA 400 uses the channel contention period to send data. The channel contention period is shared by all STAs associated with the access point.

Optionally, the processor 41 is further configured to receive contention period control signaling sent by the access point. The contention period control signaling forbids the STA to access a channel in a channel contention period before the first service period in each beacon interval. The first service period of the STA 400 is the I frame service period or the P frame service period.

Optionally, the processor 41 is further configured to receive a reference user priority sent by the access point, set a channel contention access parameter of the channel contention period according to the reference user priority, and contend for the channel in the contention period according to the channel contention access parameter, and set a priority of the I frame and a priority of the P frame according to the reference user priority. The priority of the P frame is the same as the reference user priority, the priority of the I frame is higher than the priority of the P frame, and a priority of a retransmitted frame of the STA 400 is higher than a priority of a non-retransmitted frame.

Optionally, the processor 41 is further configured to receive a result of adjustment that is sent by the access point. The result of the adjustment is sent by the access point after the access point detects a motion change of video surveillance content of the STA. The result of the adjustment includes an I frame service period of the STA 400 after the adjustment, a P frame service period of the STA 400 after the adjustment, and a reference user priority of the STA 400 after the adjustment. The I frame service period of the STA 400 after the adjustment is greater than the I frame service period before the adjustment, the P frame service period of the STA 400 after the adjustment is greater than the P frame service period before the adjustment, and the reference user priority of the STA 400 after the adjustment is higher than the reference user priority before the adjustment.

Optionally, the processor 41 is further configured to receive a result of resumption that is sent by the access point. The result of the resumption is sent by the access point after the access point detects that no motion change occurs in the video surveillance content of the STA 400. The result of the resumption includes an I frame service period of the STA 400 after the resumption, a P frame service period of the STA 400 after the resumption, and a reference user priority of the STA 400 after the resumption. The I frame service period of the STA 400 after the resumption is equal to the I frame service period before the adjustment, the P frame service period of the STA 400 after the resumption is equal to the P frame service period before the adjustment, and the reference user priority of the STA 400 after the resumption is equal to the reference user priority before the adjustment.

Optionally, the I frame service period allocated by the access point to the STA 400 is greater than the P frame service period.

In this embodiment, when the STA 400 sends the I frame or the P frame, an application layer of the STA 400 adds a frame type parameter to the I frame and the P frame transferred to a MAC layer such that the MAC layer of the STA 400 determines, according to the frame type parameter, whether a received data frame is the I frame or the P frame.

The STA 400 in this embodiment may be configured to execute the methods in Embodiment 9 and Embodiment 10. Specific implementation manners and technical effects thereof are similar. Details are not described again herein.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. An access point, comprising:
a memory comprising instructions;
a processor coupled to the memory, the instructions causing the processor to be configured to:
allocate initial sending times and sending periods of intra frames to at least two stations associated with the access point, the initial sending times corresponding to a time when the stations first send the intra frames, the sending periods corresponding to time intervals in which the stations send the intra frames, an interval between the initial sending times of the intra frames of the stations whose intra frame sending time is adjacent is not equal to a difference between intra frame sending periods of two adjacent stations, and the interval between the initial sending times of the intra frames of the two adjacent stations is greater than zero; and
allocate an intra frame service period and a predictive frame service period to each station according to the initial sending time and the sending period of the intra frame of each station, the intra frame service period comprising a contention free timeslot in which one of the stations exclusively occupies a channel, the predictive frame service comprising another contention free timeslot in which one of the stations exclusively occupies the channel, an interval (T) between the intra frame service periods of the two adjacent stations meeting a condition $T_{min} \leq T \leq T_{max}$, $T_{min}$ comprising a minimum intra frame service period, $T_{max}$ comprising a maximum intra frame service period, $T_{min}$ and $T_{max}$ being determined by the access point according to the initial sending time and the sending period of the intra frame of each station, $T_{min}$ and $T_{max}$ being calculated using the following formulas:

$$T_{min}=\min\{|(|N_{GOP}(1)-N_{GOP}(2)|/F-|T_1-T_2|)|,|T_1-T_2|\}$$

and $$T_{max}=\max\{|(|N_{GOP}(1)-N_{GOP}(2)|/F-|T_1-T_2|)|,|T_1-T_2|\},$$

$N_{GOP}(1)$ and $N_{GOP}(2)$ are lengths of groups of pictures of the two adjacent stations, F is a frame rate of the two adjacent stations, and $T_1$ and $T_2$ are the initial sending times of the intra frames of the two adjacent stations; and
a transceiver coupled to the memory and the processor, the transceiver being configured to:
send, to each station, the initial sending time and the sending period of the intra frame; and
send, to each station, a result of allocating the intra frame service period and the predictive frame service period to each station.

2. The access point of claim 1, wherein the transceiver is further configured to:
separately send a first intra frame interval setting request to each station, the first intra frame interval setting request comprising the initial sending time of each station such that each station sets its initial intra frame sending time according to the initial sending time of each station;

receive a first intra frame interval setting response returned by each station, the first intra frame interval setting response comprising an adjustment result of its initial intra frame sending time; and send a second intra frame interval setting request to each station when the adjustment result of its initial intra frame sending time indicates that each station sets its initial intra frame sending time according to the initial sending time comprised in the first intra frame interval setting request, the second intra frame interval setting request comprising the intra frame sending period of each station such that each station adjusts the intra frame sending period of each station to the sending period comprised in the second intra frame interval setting request.

3. The access point of claim 1, wherein the instructions further cause the processor to be configured to allocate a channel contention period to each station in each beacon interval, the channel contention period being used by each station to send data when each station fails to completely send all buffered data in the intra frame service period and the predictive frame service period of each station, and the channel contention period being shared by each station.

4. The access point of claim 3, wherein the instructions further cause the processor to be configured to set a reference user priority for each station according to importance of a video surveillance area or surveillance content of each station, and the transceiver is further configured to send the reference user priority of each station to each station such that each station sets a channel contention access parameter of the channel contention period and priorities of the intra frame and the predictive frame according to the reference user priority of each station.

5. The access point of claim 4, wherein the instructions further cause the processor to be configured to:

detect whether a motion change occurs in the video surveillance content of each station;

adjust an intra frame service period and a predictive frame service period that are allocated to the station when detecting that a motion change occurs in video surveillance content of any station in the stations; and adjust a reference user priority of the station when detecting that the motion change occurs in the video surveillance content of any station in the stations, an intra frame service period of the station after the adjustment is greater than the intra frame service period before the adjustment, a predictive frame service period of the station after the adjustment is greater than the predictive frame service period before the adjustment, a reference user priority of the station after the adjustment is higher than the reference user priority before the adjustment, and the transceiver is further configured to notify the station of a result of the adjustment by the processor.

6. An access point, comprising:

a memory comprising instructions;

a processor coupled to the memory, the instructions causing the processor to be configured to:

allocate initial sending times and sending periods of intra frames to at least two stations associated with the access point, the initial sending times corresponding to a time when the stations first send the intra frames, the sending periods corresponding to time intervals in which the stations send the intra frames, an interval between the initial sending times of the intra frames of the stations whose intra frame sending time is adjacent is not equal to a difference between intra frame sending periods of two adjacent stations, the interval between the initial sending times of the intra frames of the two adjacent stations is greater than zero, and the interval between the initial sending times of the intraframes of the two adjacent stations is the same;

allocate an intra frame service period and a predictive frame service period to each station according to the initial sending time and the sending period of the intra frame of each station, the intra frame service period comprising a contention free timeslot in which one of the stations exclusively occupies a channel, the predictive frame service comprising another contention free timeslot in which one of the stations exclusively occupies the channel, an interval (T) between the intra frame service periods of the two adjacent stations meeting a condition $T_{min} \leq T \leq T_{max}$, $T_{min}$ comprising a minimum intra frame service period, $T_{max}$ comprising a maximum intra frame service period, and $T_{min}$ and $T_{max}$ being determined by the access point according to the initial sending time and the sending period of the intra frame of each station;

request, by sending an intra frame interval request frame, at least one station of the two adjacent stations to adjust an intra frame sending period of the station when detecting that the interval between the initial sending time of the intra frames of the two adjacent stations is equal to the difference between the intra frame sending periods of the two adjacent stations such that after the adjustment, the interval between the initial sending time of the intra frames of the two adjacent stations is not equal to the difference between intra frame sending periods of the two adjacent stations; and request, by sending the intra frame interval request frame, at least one station of the two adjacent stations to adjust the intra frame sending period of the station when detecting that a minimum value of the interval between the intra frame service periods of the two adjacent stations $\min\{|(|N_{GOP}(1)-N_{GOP}(2)|/F-|T_1-T_2|)|, |T_1-T_2|\}$ is less than a preset interval threshold such that after the adjustment, the minimum value of the interval between the intra frame service periods of the two adjacent stations is not less than the interval threshold; and a transceiver coupled to the memory and the processor, the transceiver being configured to:

send, to each station, the initial sending time and the sending period of the intra frame; and send, to each station, a result of allocating the intra frame service period and the predictive frame service period to each station.

7. A multi-video stream transmission method, comprising:

allocating, by an access point, initial sending times and sending periods of intra frames to at least two stations associated with the access point, the initial sending times corresponding to a time when the stations first send the intra frames, the sending periods corresponding to time intervals in which the stations send the intra frames, an interval between the initial sending times of the intra frames of the two stations whose intra frame sending time is adjacent is not equal to a difference between intra frame sending periods of two adjacent stations, and the interval between the initial sending times of the intra frames of the two adjacent stations is greater than zero;

sending, by the access point, the initial sending time and the sending period of the intra frame to each station of the at least two stations;

allocating, by the access point, an intra frame service period and a predictive frame service period to each station according to the initial sending time and the sending period of the intra frame of each station, the intra frame service period comprising a contention free timeslot in which one of the stations exclusively occupies a channel, the predictive frame service comprising another contention free timeslot in which one of the stations exclusively occupies the channel, an interval (T) between the intra frame service periods of the two adjacent stations meeting a condition $T_{min} \leq T \leq T_{max}$, $T_{min}$ comprising a minimum intra frame service period, $T_{max}$ comprising a maximum intra frame service period, $T_{min}$ and $T_{max}$ being determined by the access point according to the initial sending time and the sending period of the intra frame of each station, $T_{min}$ and $T_{max}$ being calculated using the following formulas:

$$T_{min} = \min\{|(|N_{GOP}(1) - N_{GOP}(2)|/F - |T_1 - T_2|)|, |T_1 - T_2|\}$$

and $$T_{max} = \max\{|(|N_{GOP}(1) - N_{GOP}(2)|/F - |T_1 - T_2|)|, |T_1 - T_2|\},$$

$N_{GOP}(1)$ and $N_{GOP}(2)$ are lengths of groups of pictures of the two adjacent stations, F is a frame rate of the two adjacent stations, and $T_1$ and $T_2$ are the initial sending time of the intra frames of the two adjacent stations, and sending, by the access point to each station, a result of allocating the intra frame service period and the predictive frame service period to each station.

8. The method of claim 7, wherein sending the initial sending time and the sending period of the intra frame to each station comprises:

separately sending, by the access point, a first intra frame interval setting request to each station, the first intra frame interval setting request comprising the initial sending time of each station such that each station sets its initial intra frame sending time according to the initial sending time of each station;

receiving, by the access point, a first intra frame interval setting response returned by each station, the first intra frame interval setting response comprising an adjustment result of the initial intra frame sending time of each station; and sending, by the access point, a second intra frame interval setting request to each station when the adjustment result of the initial intra frame sending time of each station indicates that each station sets the initial intra frame sending time of each station according to the initial sending time comprised in the first intra frame interval setting request, the second intra frame interval setting request comprising the intra frame sending period of each station such that each station adjusts its intra frame sending period to the sending period comprised in the second intra frame interval setting request.

9. The method of to claim 7, further comprising allocating, by the access point, a channel contention period to each station in each beacon interval, the channel contention period being used by each station to send data when each station fails to completely send all buffered data in the intra frame service period and the predictive frame service period of each station, and the channel contention period being shared by each station.

10. The method of claim 9, further comprising:

setting, by the access point, a reference user priority for each station according to importance of a video surveillance area or surveillance content of each station; and sending, by the access point, the reference user priority of each station to each station such that each station sets a channel contention access parameter of the channel contention period and priorities of the intra frame and the predictive frame according to the reference user priority of each station.

11. The method of claim 10, further comprising:

detecting, by the access point, whether a motion change occurs in the video surveillance content of each station;

adjusting, by the access point, an intra frame service period and a predictive frame service period that are allocated to the station when the access point detects that a motion change occurs in video surveillance content of any station in the stations;

adjusting a reference user priority of the station when the access point detects that the motion change occurs in the video surveillance content of any station in the stations, an intra frame service period of the station after the adjustment is greater than the intra frame service period before the adjustment, a predictive frame service period of the station after the adjustment is greater than the predictive frame service period before the adjustment, and a reference user priority of the station after the adjustment is higher than the reference user priority before the adjustment; and notifying, by the access point, the station of a result of the adjustment.

12. A multi-video stream transmission method, comprising:

allocating, by an access point, initial sending times and sending periods of intra frames to at least two stations associated with the access point, the initial sending times corresponding to a time when the stations first send the intra frames, the sending periods corresponding to time intervals in which the stations send the intra frames, an interval between the initial sending times of the intra frames of the two stations whose intra frame sending time is adjacent is not equal to a difference between intra frame sending periods of two adjacent stations, the interval between the initial sending times of the intra frames of the two adjacent stations is greater than zero, and the interval between the initial sending times of the intra frames of the two adjacent stations is the same;

sending, by the access point, the initial sending time and the sending period of the intra frame to each station of the at least two stations;

allocating, by the access point, an intra frame service period and a predictive frame service period to each station according to the initial sending time and the sending period of the intra frame of each station, the intra frame service period comprising a contention free timeslot in which one of the stations exclusively occupies a channel, the predictive frame service comprising another contention free timeslot in which one of the stations exclusively occupies the channel, an interval (T) between the intra frame service periods of the two adjacent stations meeting a condition $T_{min} \leq T \leq T_{max}$, $T_{min}$ comprising a minimum intra frame service period, $T_{max}$ comprising a maximum intra frame service period, and $T_{min}$ and $T_{max}$ being determined by the access point according to the initial sending time and the sending period of the intra frame of each station;

sending, by the access point to each station, a result of allocating the intra frame service period and the predictive frame service period to each station;

requesting, by the access point by sending an intra frame interval request frame, at least one station of the two adjacent stations to adjust an intra frame sending period of the station when the access point detects that the interval between the initial sending time of the intra frames of the two adjacent stations is equal to the difference between the intra frame sending periods of the two adjacent stations such that after the adjustment, the interval between the initial sending time of the intra frames of the two adjacent stations is not equal to the difference between intra frame sending periods of the two adjacent stations; and requesting, by the access point by sending the intra frame interval request frame, at least one station of the two adjacent stations to adjust the intra frame sending period of the station when the access point detects that a minimum value of the interval between the intra frame service periods of the two adjacent stations $\min\{|(|N_{GOP}(1)-N_{GOP}(2)|/F-|T_1-T_2|)|, |T_1-T_2|\}$ is less than a preset interval threshold such that after the adjustment, the minimum value of the interval between the intra frame service periods of the two adjacent stations is not less than the interval threshold.

* * * * *